United States Patent
Fujisawa

(10) Patent No.: US 11,467,783 B2
(45) Date of Patent: Oct. 11, 2022

(54) PRINTING SYSTEM, PRINTING METHOD, AND INFORMATION PROCESSING APPARATUS

(71) Applicant: SEIKO EPSON CORPORATION, Tokyo (JP)

(72) Inventor: Takatoshi Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/071,196

(22) Filed: Oct. 15, 2020

(65) Prior Publication Data

US 2021/0117136 A1   Apr. 22, 2021

(30) Foreign Application Priority Data

Oct. 18, 2019   (JP) .............................. JP2019-190780

(51) Int. Cl.
*G06F 3/12* (2006.01)
*H04N 1/00* (2006.01)

(52) U.S. Cl.
CPC .......... *G06F 3/1208* (2013.01); *G06F 3/1256* (2013.01); *G06F 3/1204* (2013.01); *G06F 3/1288* (2013.01); *H04N 1/00403* (2013.01)

(58) Field of Classification Search
CPC .... G06F 3/1208; G06F 3/1256; G06F 3/1288; G06F 3/1285; G06F 3/1265; G06F 3/1204; H04N 1/00403
USPC ...................................................... 358/1.15
See application file for complete search history.

(56) References Cited

U.S. PATENT DOCUMENTS

| | | | |
|---|---|---|---|
| 2016/0299728 A1* | 10/2016 | Li | G06F 3/1292 |
| 2017/0289368 A1* | 10/2017 | Kirihata | H04N 1/442 |
| 2019/0235811 A1* | 8/2019 | Kobayashi | H04N 1/0048 |
| 2019/0384542 A1* | 12/2019 | Tomioka | H04N 1/00488 |
| 2020/0030568 A1* | 1/2020 | Zola | A61B 5/112 |
| 2020/0128495 A1* | 4/2020 | Schwent | H04W 52/386 |

FOREIGN PATENT DOCUMENTS

JP   2015-213256   11/2015

OTHER PUBLICATIONS

T.B. Martin, Apr. 1, 1976, Proceedings of the IEEE (vol. 64, Issue: 4, pp. 487-501).*

* cited by examiner

*Primary Examiner* — Darryl V Dottin
(74) *Attorney, Agent, or Firm* — Workman Nydegger

(57) ABSTRACT

A printing system includes a printing apparatus and an information processing apparatus coupled to the printing apparatus via a network, and displays a screen on a display section. The information processing apparatus includes an information acquisition section that acquires information including a keyword included in a print instruction by voice from a voice intermediary apparatus, a preview processing section that displays a print preview screen corresponding to a content based on the acquired keyword on the display section, and a print data transmission section that generates print data that uses the content and transmits the print data to the printing apparatus. The printing apparatus receives the print data and executes printing according to the print data.

11 Claims, 18 Drawing Sheets

| USER ID | SMART SPEAKER ID | DISPLAY ID | PREVIEW OUTPUT DESTINATION | PREVIEW DISPLAY SETTING | PRINTER ID |
|---|---|---|---|---|---|
| UID-1 | SID-1 | DID-1 | TERMINAL-1 | DISPLAY | PID-1 |
| UID-2 | SID-2 | SID-2 | VOICE INTERMEDIARY APPARATUS | NOT DISPLAY | PID-2 |
| UID-3 | SID-3 | | | DISPLAY | PID-3 |
| UID-4 | SID-4 | DID-4 | VOICE INTERMEDIARY APPARATUS | DISPLAY | PID-4 |
| UID-5 | SID-4 | DID-5 | VOICE INTERMEDIARY APPARATUS | NOT DISPLAY | PID-4 |
| UID-6 | SID-5 | SID-5 | | NOT DISPLAY | PID-5 |
| UID-7 | SID-6 | PID-6 | PRINTER-1 | DISPLAY | PID-6 |
| ... | ... | ... | ... | ... | ... |

↑UID  ↑SID  ↑DID  ↑DISPLAY DESTINATION INFORMATION IM11  ↑DISPLAY SETTING INFORMATION IM12  ↑PID

| PRINTER ID | USER ID | PRINT SETTING |
|---|---|---|
| PID-1 | UID-1 | (DEFAULT) A4, PORTRAIT, COLOR, STANDARD IMAGE QUALITY, ⋯ |
| PID-2 | UID-2 | (DEFAULT) A4, PORTRAIT, COLOR, STANDARD IMAGE QUALITY, ⋯ |
| PID-3 | UID-3 | (DEFAULT) A4, PORTRAIT, COLOR, STANDARD IMAGE QUALITY, ⋯ |
| PID-4 | UID-4 | A3, LANDSCAPE, COLOR, HIGH IMAGE QUALITY, ACTUAL SIZE, ⋯ |
| | UID-5 | A4, PORTRAIT, MONOCHROME, STANDARD IMAGE QUALITY, FIT TO PAPER, ⋯ |
| PID-5 | UID-6 | (DEFAULT) A4, PORTRAIT, COLOR, STANDARD IMAGE QUALITY, ⋯ |
| PID-6 | UID-7 | POSTCARD, PORTRAIT, COLOR, HIGH IMAGE QUALITY, ⋯ |
| ⋯ | ⋯ | ⋯ |

↑ PID   ↑ UID   ↑ PS1

KE0: + REQUEST KEYWORD "PRINT" AND THE LIKE

| KEYWORD | CONTENT CO1 |
|---|---|
| RECOMMENDED PHOTO | PHOTO 1, PHOTO 2, ··· |
| RECOMMENDED COLORING LINE | COLORING LINE 1, COLORING LINE 2, ··· |
| USUAL NEWS | http://example.com/news/print/ |
| WEATHER FORECAST | http://example1.co.jp/forecast.htm |
| COLORING LINE BEFORE THIS | LATEST COLORING LINE IN PRINT HISTORY |
| ··· | ··· |

KE0 → PRINT START KEYWORD KE1
PRINT START, PRINT EXECUTION, ···

KE0 → PRINT SETTING KEYWORD KE2
A3, A4, PORTRAIT, LANDSCAPE, COLOR, MONOCHROME, HIGH QUALITY IMAGE, ···

KE0 → DISPLAY CHANGE KEYWORD KE3
ENLARGE, REDUCE, PAGE TURNING, ···

KE0 → SELECTION KEYWORD KE4
FIRST, SECOND, THIRD, ···

KE0 → THUMBNAIL DISPLAY KEYWORD KE5
THUMBNAIL DISPLAY, OTHERS, ···

KE0 → PRINT CANCELLATION KEYWORD KE6
PRINT CANCELLATION, CANCEL, ···

PRINTING SYSTEM, PRINTING METHOD, AND INFORMATION PROCESSING APPARATUS

The present application is based on, and claims priority from JP Application Serial Number 2019-190780, filed Oct. 18, 2019, the disclosure of which is hereby incorporated by reference herein in its entirety.

BACKGROUND

1. Technical Field

The present disclosure relates to a printing system including a printing apparatus and an information processing apparatus, a printing method, and an information processing apparatus.

2. Related Art

In recent years, printers were made to execute printing via a server computer that provides a cloud print service.

In addition, in recent years, smart speakers that cooperate with a voice recognition service on the cloud became commercially available.

As a reference, JP-A-2015-213256 discloses a printing system in which an image forming apparatus and a client PC are coupled to each other via a LAN. A voice user of the printing system first needs to input print data from the client PC to the image forming apparatus, and then needs to go to the image forming apparatus. After that, the user can hear a voice indicating print start, function selection, and the like from the image forming apparatus, and can cause the image processing apparatus to perform a specific function such as copying or a box by voice.

With the above-described technology, it is not possible to instruct the client PC to print by voice.

In particular, when using a commercially available smart speaker for printing, the contents to be printed are designated by voice. In this case, it is desirable to consider the possibility of printing contents which is different from those expected by the user. In particular, when a content corresponding to a keyword is randomly selected and printed, there is a possibility that the content that the user does not like is printed.

SUMMARY

According to an aspect of the present disclosure, there is provided a printing system including a printing apparatus and an information processing apparatus coupled to the printing apparatus via a network, and displays a screen on a display section, in which the information processing apparatus includes an information acquisition section that acquires information including a keyword included in a print instruction by voice from a voice intermediary apparatus, a preview processing section that displays a print preview screen corresponding to a content based on the acquired keyword on the display section, and a print data transmission section that generates print data using the content and transmits the print data to the printing apparatus, and the printing apparatus receives the print data and executes printing according to the print data.

According to another aspect of the present disclosure, there is provided a printing method using a printing apparatus, an information processing apparatus coupled to the printing apparatus via a network, and a display section, the method including: an information acquiring step of acquiring information including a keyword included in a print instruction by voice from a voice intermediary apparatus in the information processing apparatus; a preview processing step of displaying the print preview screen corresponding to a content based on the acquired keyword on the display section; a print data generating step of generating print data using the contents; a print data transmitting step of transmitting the generated print data to the printing apparatus from the information processing apparatus; and a printing step of executing printing in the printing apparatus according to the transmitted print data.

According to still another aspect of the present disclosure, there is provided an information processing apparatus that is coupled to a printing apparatus for executing printing according to print data via a network and displays a screen on a display section, the apparatus including: an information acquisition section that acquires information including a keyword included in a print instruction by voice from a voice intermediary apparatus; a preview processing section that displays a print preview screen corresponding to a content based on the acquired keyword on the display section; and a print data transmission section that generates print data that uses the content and transmits the print data to the printing apparatus.

According to still another aspect of the present disclosure, there is provided an information processing program for an information processing apparatus that is coupled to a printing apparatus for executing printing according to print data via a network and displays a screen on a display section, the program causing a computer to execute an information acquisition function of acquiring information including a keyword included in a print instruction by voice from a voice intermediary apparatus, a preview processing function of displaying a print preview screen corresponding to a content based on the acquired keyword on the display section, and a print data transmission function of generating print data using the content and transmitting the print data to the printing apparatus.

BRIEF DESCRIPTION OF THE DRAWINGS

FIG. 3 is a diagram schematically illustrating a structural example of management information.

FIG. 4 is a diagram schematically illustrating a structural example of print setting registration information.

FIG. 5 is a diagram schematically illustrating a structural example of a keyword table.

DESCRIPTION OF EXEMPLARY EMBODIMENTS

Figure 1:
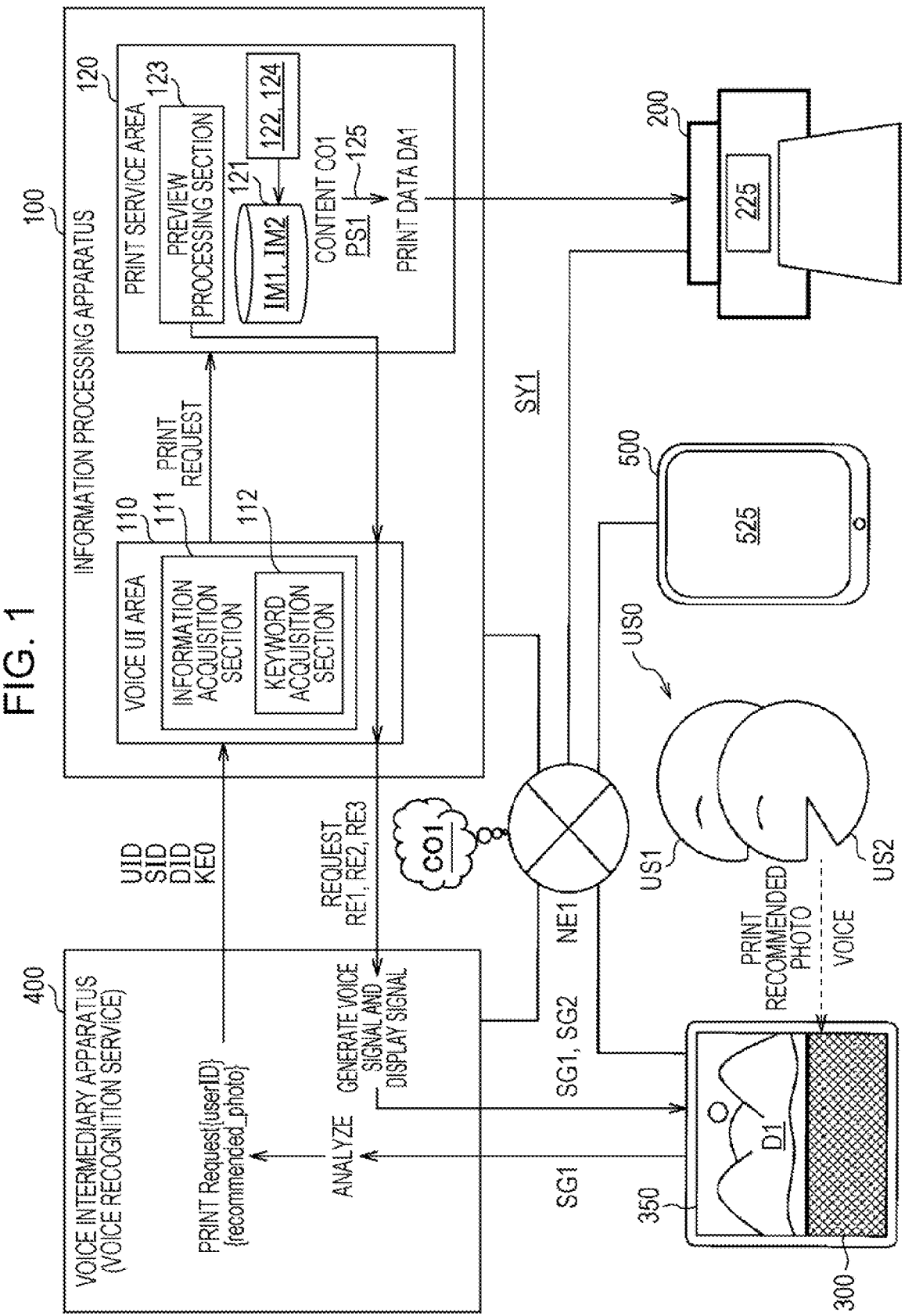
FIG. 1 is a block diagram schematically illustrating a configuration example of a system including a printing system.

Hereinafter, embodiments of the present disclosure will be described. It is needless to say that the following embodiments merely exemplify the present disclosure, and not all the features illustrated in the embodiments are essential to the means for solving the disclosure.

(1) Outline of Technology Included in Present Disclosure

First, an outline of the technology included in the present disclosure will be described with reference to the examples illustrated in FIGS. 1 to 18. Furthermore, the drawings of the present application are schematic views illustrating examples, and there are cases where the enlargement ratios in the respective directions illustrated in the drawings are different from each other and each drawing do not match each other. It is needless to say that each element of the present technology is not limited to the specific example indicated by the reference numerals. In the "Outline of Technology included in Present Disclosure", parentheses mean a supplementary description of the immediately preceding word.

Aspect 1:

A printing system SY1 according to an aspect of the present technology includes a printing apparatus (for example, a printer 200) and an information processing apparatus 100 coupled to the printing apparatus (200) via a network NE1, and displays a screen on a display section 350. The information processing apparatus 100 includes an information acquisition section 111, a preview processing section 123, and a print data transmission section 125. The information acquisition section 111 acquires information including a keyword KE0 included in a print instruction by voice from a voice intermediary apparatus 400. The preview processing section 123 displays a print preview screen D1 corresponding to a content CO1 based on the acquired keyword KE0 on the display section 350. The print data transmission section 125 generates print data DA1 using the content CO1 and transmits the print data DA1 to the printing apparatus (200). The printing apparatus (200) receives the print data DA1 and executes printing according to the print data DA1.

In the above-described Aspect 1, since the print preview screen D1 corresponding to the content CO1 based on the keyword KE0 is displayed, a user US0 can visually confirm the content CO1 to be printed by looking at the print preview screen D1. Accordingly, the user US0 gets to know whether or not the intended content CO1 is printed. Therefore, according to this aspect, it is possible to provide a printing system capable of suppressing the unintended printing when the user instructs the printing by voice.

Here, the information processing apparatus may be one computer or a plurality of computers coupled to each other.

The display section may be under the management of the voice intermediary apparatus or may not be under the management of the voice intermediary apparatus. In addition, the display section may be integrated with a voice input/output apparatus managed by the voice intermediary apparatus, or may be an apparatus which is not integrated with the voice input/output apparatus.

The keyword is not limited to a word, and may be a phrase, a clause, or the like, as long as the keyword is a word handled collectively when specifying the content.

Furthermore, the above-described additional remarks are also applied to the following aspects.

Figure 14:
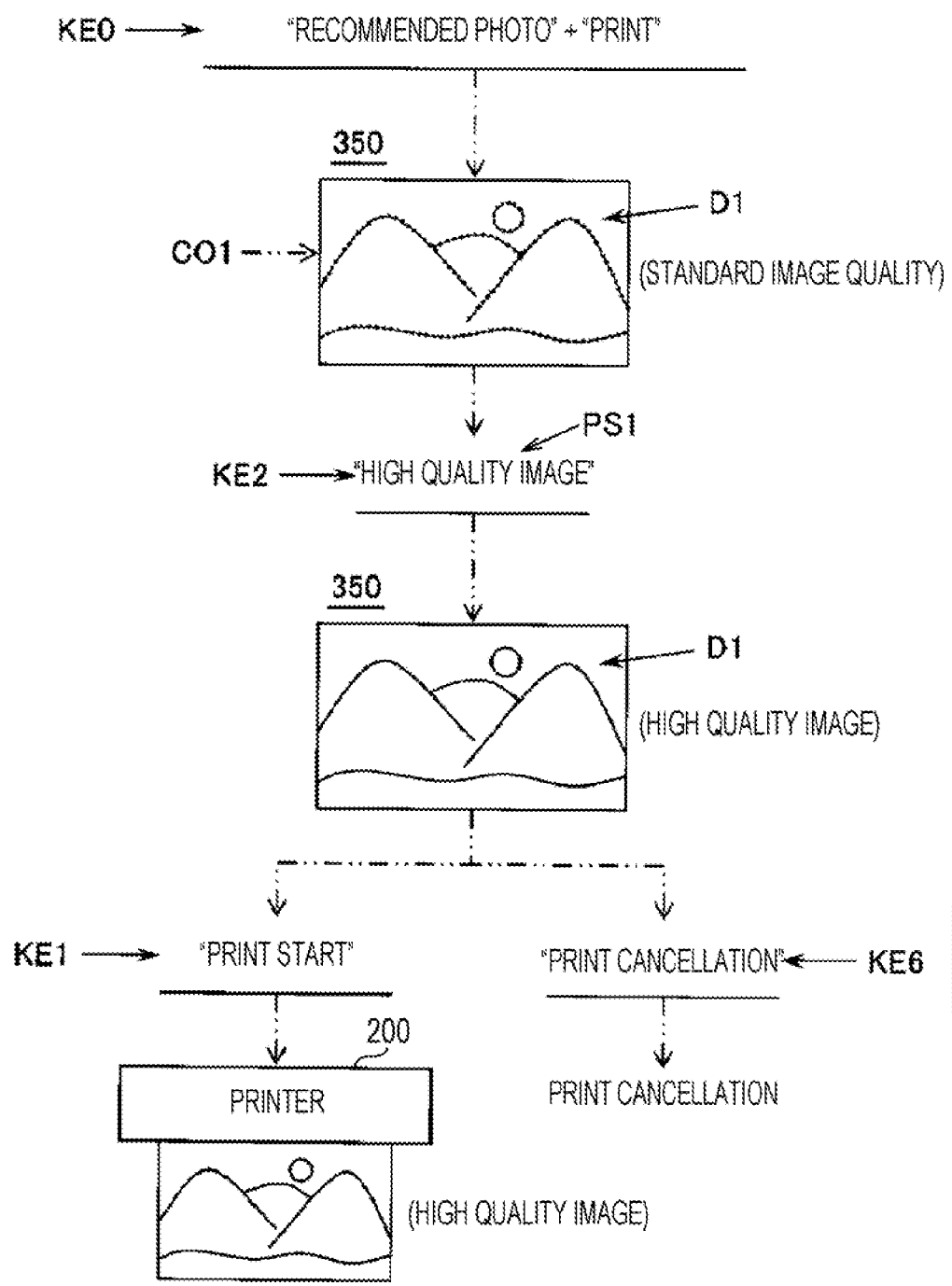
FIG. 14 is a diagram schematically illustrating an example of a print preview screen and printing.

Aspect 2:

As illustrated in FIGS. 5, 14 and the like, the keyword KE0 may include a print start keyword KE1 that starts printing of the content CO1 corresponding to the print preview screen D1. The print data transmission section 125 may transmit the print data DA1 to the printing apparatus (200) when the print start keyword KE1 is acquired by the information acquisition section 111. Accordingly, when the user US0 issues a voice instruction for starting the printing, printing of the content CO1 corresponding to the print preview screen D1 starts. Therefore, this aspect can provide a preferable example of suppressing printing that is not intended by the user.

Figure 13:
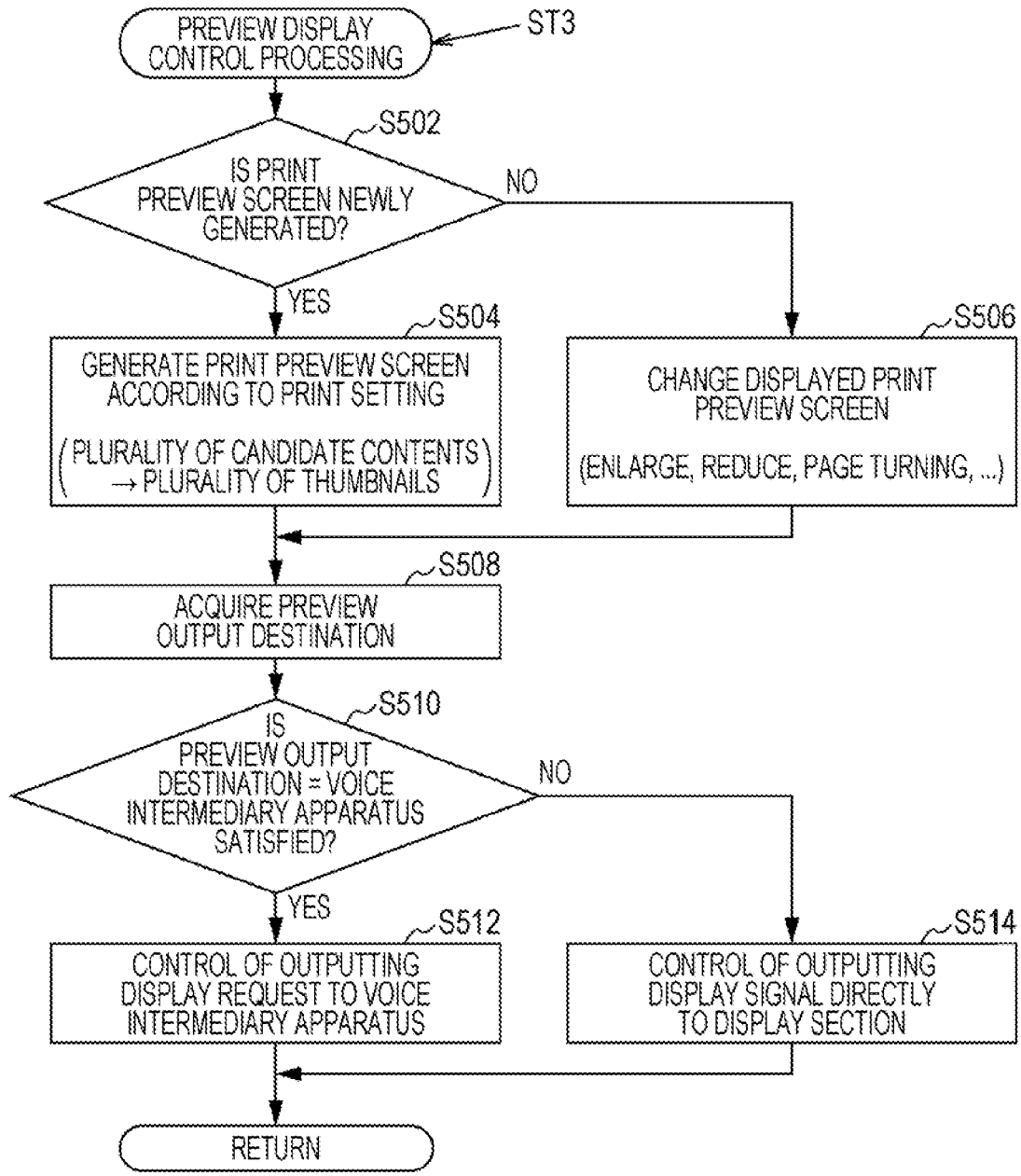
FIG. 13 is a flowchart schematically illustrating an example of preview display control processing.

Aspect 3:

As illustrated in FIGS. 1, 3, and 13, the preview processing section 123 may output a display request RE2 for displaying the print preview screen D1 on the display section 350 to the voice intermediary apparatus 400 when the voice intermediary apparatus 400 can display the screen on the display section 350. This aspect can provide a preferable example in which the print preview screen is displayed on the display section when the voice intermediary apparatus manages the display section.

Figure 8:
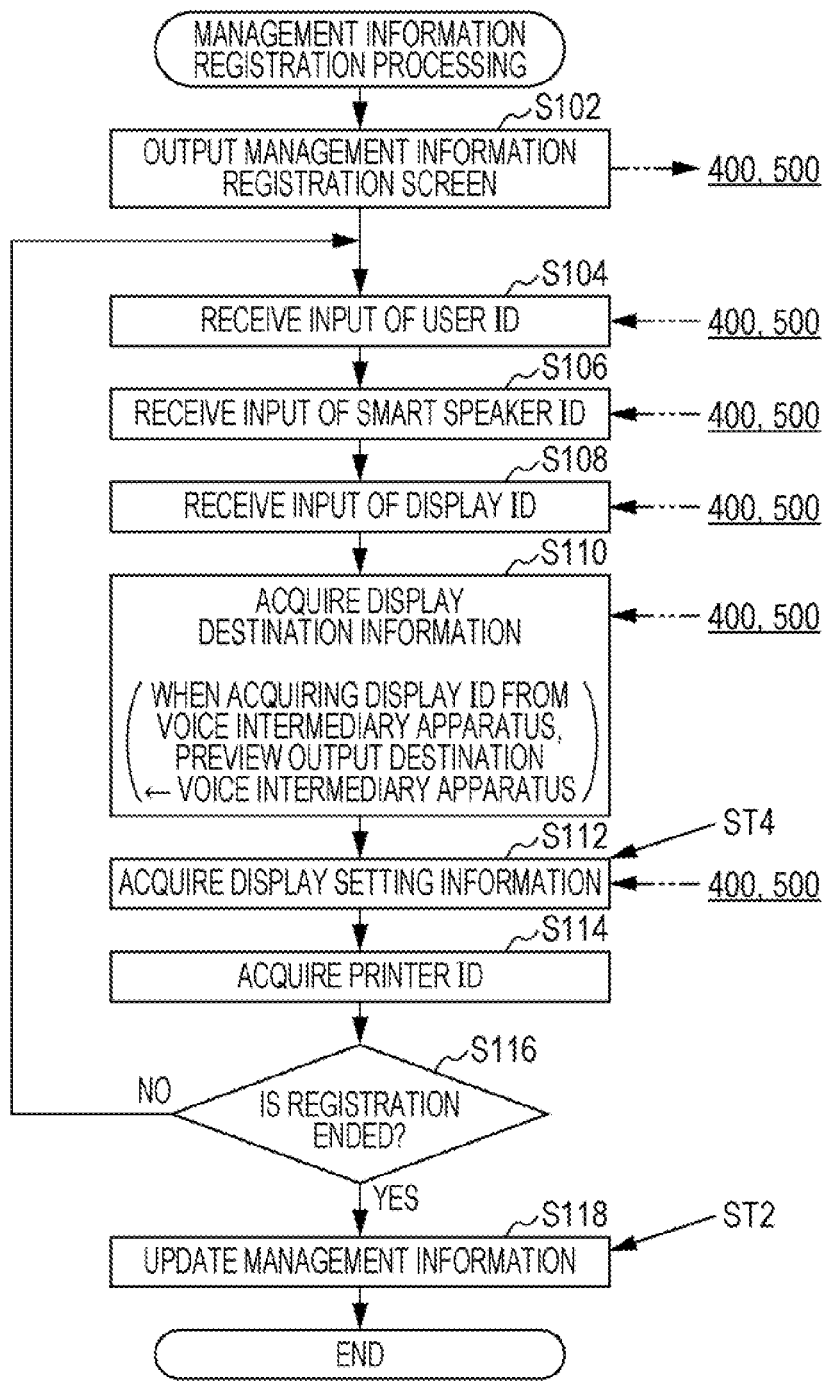
FIG. 8 is a flowchart schematically illustrating an example of management information registration processing.
Figure 12:
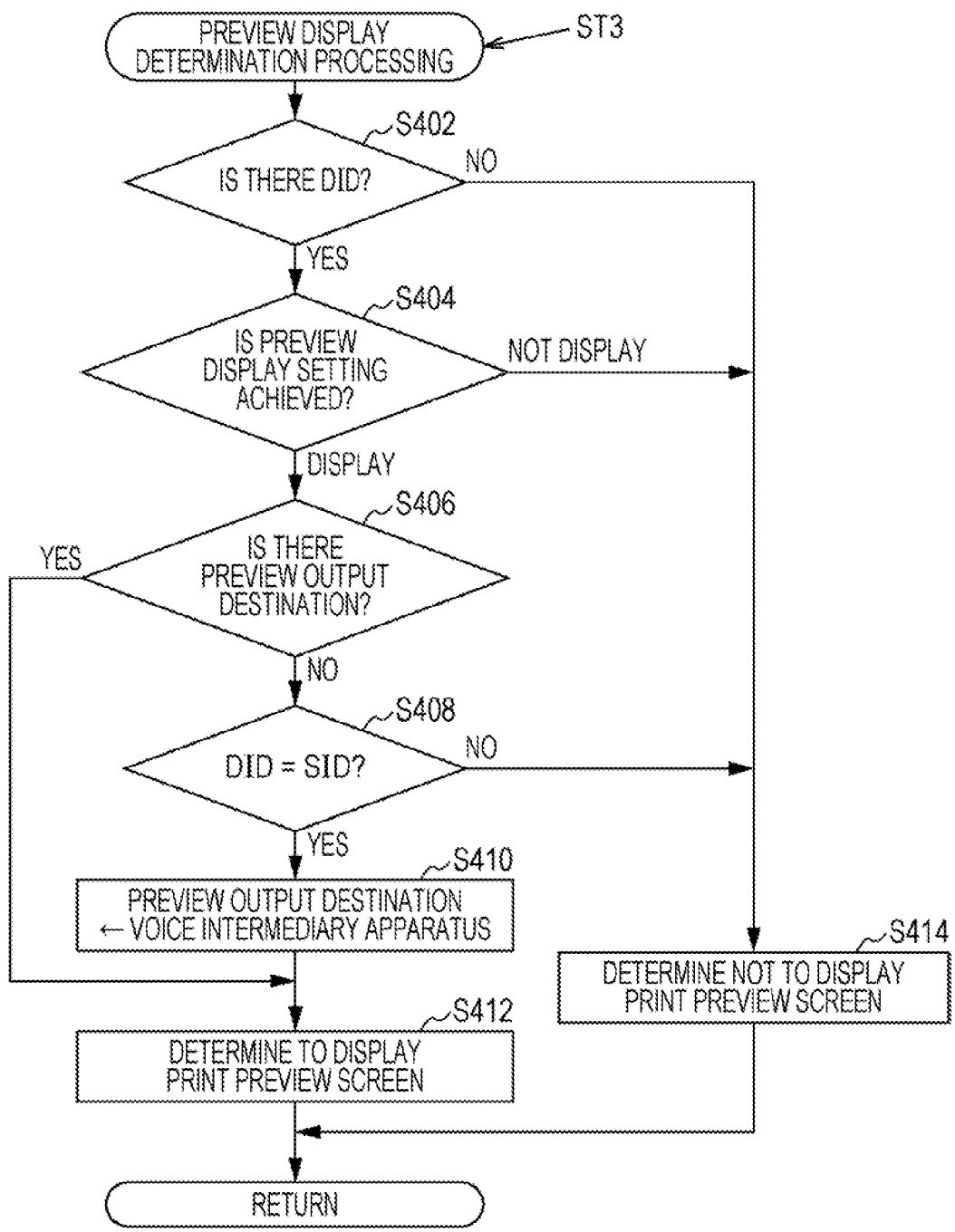
FIG. 12 is a flowchart schematically illustrating an example of preview display determination processing.

Aspect 4:

As illustrated in FIGS. 8 and 12, the preview processing section 123 may determine that the voice intermediary apparatus 400 is able to display the screen on the display section 350 when the information from the voice intermediary apparatus 400 includes display section identification information DID for identifying the display section 350. In this case, the preview processing section 123 may output the display request RE2 to the voice intermediary apparatus 400. This aspect can provide a preferable specific example in which the print preview screen is displayed on the display section when the voice intermediary apparatus manages the display section.

Figure 2:
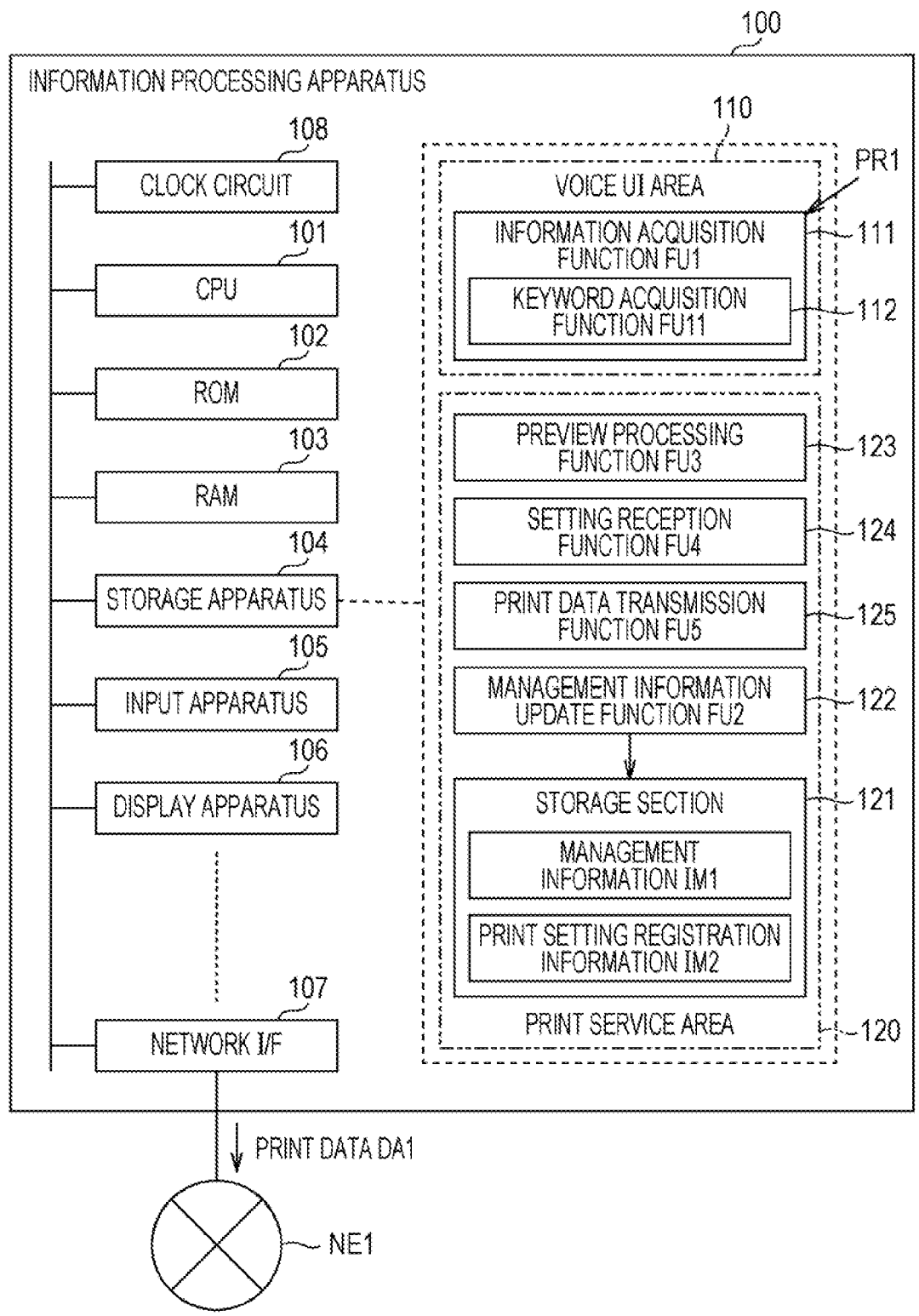
FIG. 2 is a block diagram schematically illustrating a configuration example of an information processing apparatus.

Aspect 5:

As illustrated in FIGS. 2 and 3, the information processing apparatus 100 may further include a storage section 121 that stores management information IM1 in which voice input/output apparatus identification information SID for identifying a voice input/output apparatus (for example, a smart speaker 300) managed by the voice intermediary apparatus 400 and display section identification information DID for identifying the display section 350 are associated with the user identification information UID for identifying the user US0. The preview processing section 123 may display the print preview screen D1 on the display section 350 corresponding to the display section identification information DID. This aspect can provide a preferable example in which the print preview screen is displayed on the display section.

Here, the various identification information may be information for substantially identifying the identification target, and may be information that changes during the processing. This case is also included in the present technology. For example, when a character string for identifying a user, such as an access token, is transmitted and received between different apparatuses, even when the character string differs from the information actually stored in the storage section, the character string is included in the user identification information of the present technology.

Aspect 6:

As illustrated in FIGS. 2, 8 and the like, the information processing apparatus 100 may further include a management information update section 122 that updates the management information IM1 based on the information from the voice intermediary apparatus 400. This aspect can provide a preferable example of updating the management information.

Figure 18:
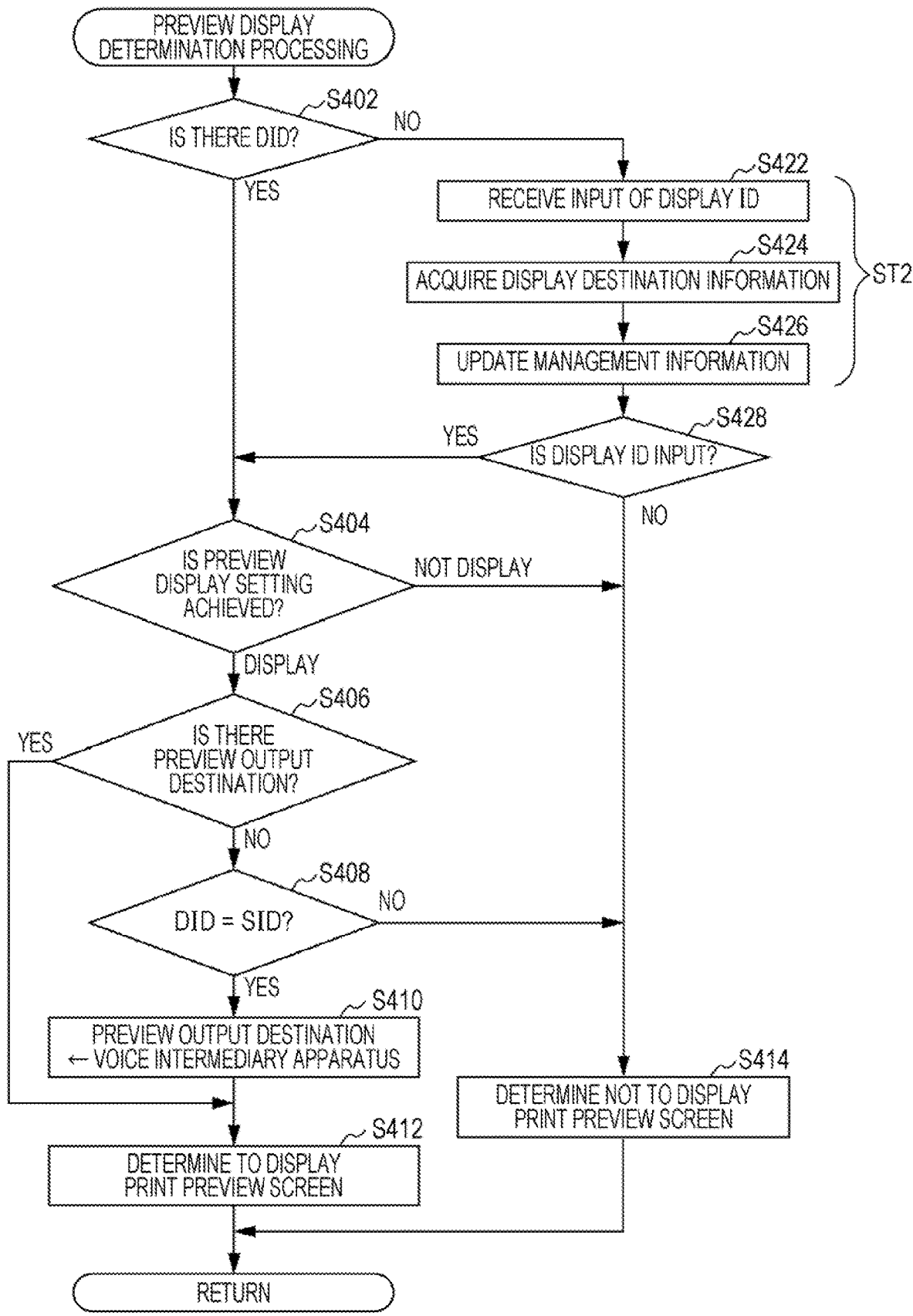
FIG. 18 is a flowchart schematically illustrating another example of the preview display determination processing.

Aspect 7:

As illustrated in FIG. 18, when the display section identification information DID is not associated with the user identification information UID associated with the print instruction, the management information update section 122 may perform processing of receiving the input of the display section identification information DID. The management information update section 122 may update the management information IM1 to a state where the display section identification information DID is associated with the user identification information UID when the display section identification information DID is input. According to this aspect, even when the display section identification information DID is not associated with the user identification information UID associated with the print instruction, the display of the print preview screen D1 becomes possible, and thus, the convenience of the user can be improved.

Aspect 8:

As illustrated in FIG. 12 and the like, the preview processing section 123 may output the display request RE2 for displaying the print preview screen D1 on the display section 350 to the voice intermediary apparatus 400 when the display section identification information DID is the same as the voice input/output apparatus identification information SID for the user identification information UID associated with the print instruction. When the display section identification information DID is the same as the voice input/output apparatus identification information SID for the user identification information UID associated with the print instruction, the user US0 uses the voice input/output apparatus (300) including the display section 350. Therefore, this aspect can provide a preferable example in which the print preview screen is displayed on the display section when the voice input/output apparatus includes the display section.

Figure 10:
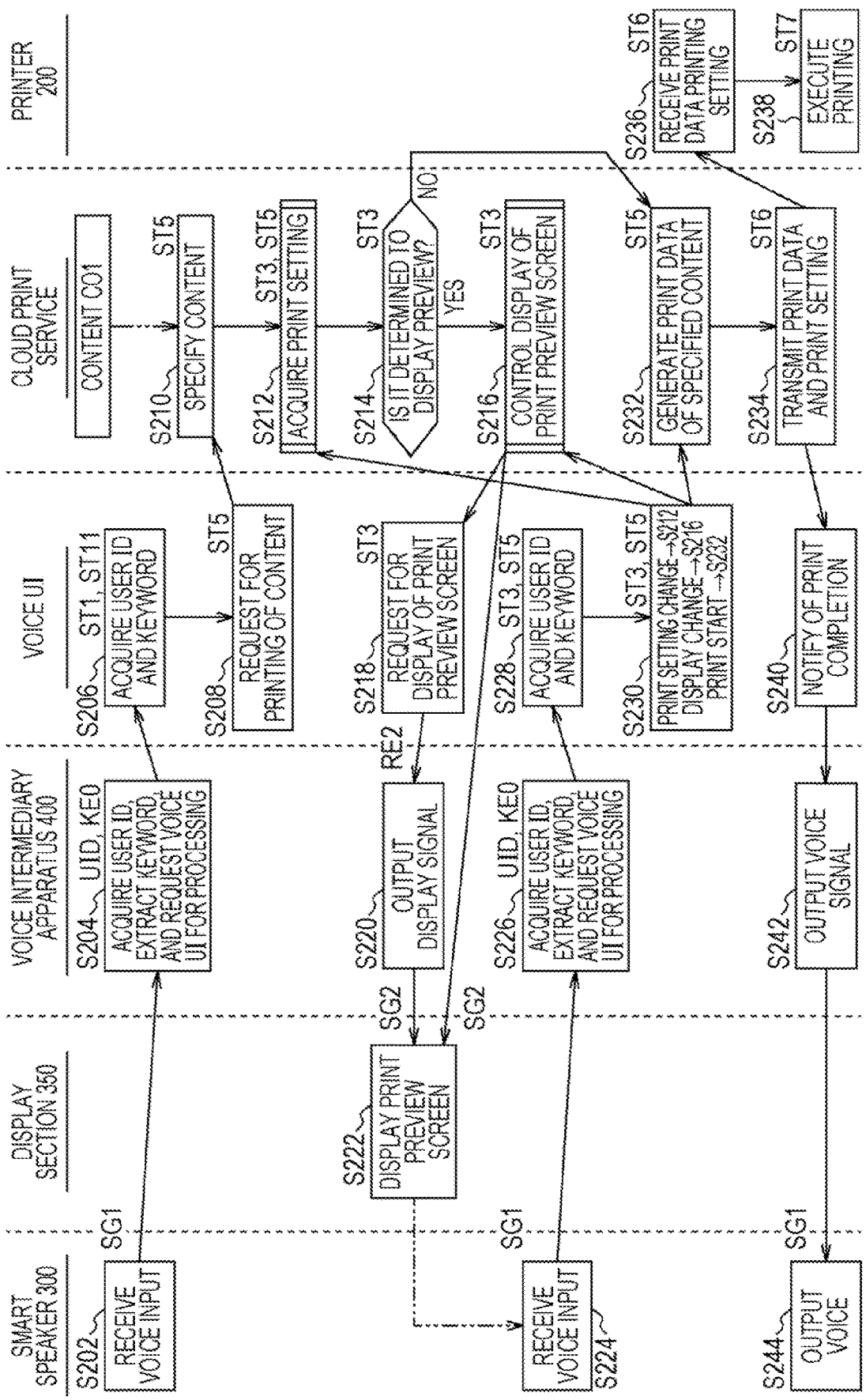
FIG. 10 is a diagram schematically illustrating an example of processing until printing is executed by voice input.

Aspect 9:

As illustrated in FIGS. 2, 3 and the like, the storage section 121 may store the management information IM1 in which the display destination information IM11 indicating whether to output the display request RE2 for displaying the print preview screen D1 on the display section 350 to the voice intermediary apparatus 400 is associated with the user identification information UID. As illustrated in FIGS. 10 and 13, when the display destination information IM11 indicates that the display request RE2 is output to the voice intermediary apparatus 400, the preview processing section 123 may output the display request RE2 to the voice intermediary apparatus 400. This aspect can provide a preferable example in which the print preview screen is displayed on the display section when the voice input/output apparatus includes the display section.

Aspect 10:

As illustrated in FIGS. 2, 3, and 8, the information processing apparatus 100 may further include a setting reception section 124 that receives any one of a first setting (for example, "display" illustrated in FIG. 3) for displaying the print preview screen D1 and a second setting (for example, "not display" illustrated in FIG. 3) for not displaying the print preview screen D1. As illustrated in FIGS. 10 and 12, the preview processing section 123 may display the print preview screen D1 on the display section 350 when the first setting is received. The preview processing section 123 may not display the print preview screen D1 on the display section 350 when the second setting is received. In this aspect, since the user US0 can select whether to display the print preview screen D1 according to the preference, the convenience of the user can be improved.

Aspect 11:

In addition, a printing method according to an aspect of the present technology is a printing method using the printing apparatus (for example, the printer 200), the information processing apparatus 100 coupled to the printing apparatus (200) via a network NE1, and the display section 350, and includes an information acquiring step ST1, a preview processing step ST3, a print data generating step ST5, a print data transmitting step ST6, and a printing step ST7. In the information acquiring step ST1, information including the keyword KE0 included in the print instruction by voice is acquired from the voice intermediary apparatus 400 in the information processing apparatus 100. In the preview processing step ST3, a print preview screen D1 corresponding to a content CO1 based on the acquired keyword KE0 is displayed on the display section 350. In the print data generating step ST5, the print data DA1 using the content CO1 is generated. In the print data transmitting step ST6, the generated print data DA1 is transmitted to the printing apparatus (200) to the information processing apparatus 100. In the printing step ST7, printing is executed in the printing apparatus (200) according to the transmitted print data DA1. Therefore, according to this aspect, it is possible to provide the printing method capable of suppressing the unintended printing when the user instructs the printing by voice.

The printing method may further include a management information updating step ST2 corresponding to the management information update section 122 and a setting receiving step ST4 corresponding to the setting reception section 124.

Aspect 12:

Furthermore, the information processing apparatus 100 according to an aspect of the present technology is the information processing apparatus 100 that is coupled to the printing apparatus (for example, the printer 200) that executes printing according to the print data DA1 via the network NE1, and displays the screen on the display section 350, and includes the information acquisition section 111, the preview processing section 123, and the print data transmission section 125. The information acquisition section 111 acquires information including a keyword KE0 included in a print instruction by voice from a voice intermediary apparatus 400. The preview processing section 123 displays a print preview screen D1 corresponding to a content CO1 based on the acquired keyword KE0 on the display section 350. The print data transmission section 125 generates print data DA1 using the content CO1 and transmits the print data DA1 to the printing apparatus (200). Therefore, according to this aspect, it is possible to provide the information processing apparatus capable of suppressing the unintended printing when the user instructs the printing by voice.

Aspect 13:

Furthermore, an information processing program PR1 according to an aspect of the present technology is an information processing program PR1 for the information processing apparatus 100 which is coupled to the printing apparatus (for example, the printer 200) that executes printing according to the print data DA1 via the network NE1, and displays the screen on the display section 350, and causes a computer (for example, the information processing apparatus 100) to realize an information acquisition function FU1, a preview processing function FU3, and a print data transmission function FU5. The information acquisition function FU1 is for acquiring information including the keyword KE0 included in the print instruction by voice from the voice intermediary apparatus 400. The preview processing function FU3 is for displaying the print preview screen D1 corresponding to the content CO1 based on the acquired keyword KE0 on the display section 350. The print data transmission function FU5 is for generating the print data DA1 using the content CO1 and transmitting the print data DA1 to the printing apparatus (200). Therefore, according to this aspect, it is possible to provide the non-transitory computer-readable storage medium storing an information processing program capable of suppressing the unintended printing when the user instructs the printing by voice.

The information processing program PR1 may further cause the computer to realize a management information update function FU2 corresponding to the management information update section 122 and a setting reception function FU4 corresponding to the setting reception section 124.

Furthermore, the present technology is applicable to a composite system including the above-described printing system, a composite apparatus including the above-described information processing apparatus, an information processing method implemented by the above-described information processing apparatus, a computer readable medium in which the above-described information processing program is recorded, and the like. Any of the above-described apparatuses may be configured of a plurality of dispersed parts.

(2) Background of Present Technology

In recent years, smart speakers that cooperate with a voice recognition service on the cloud became commercially available. When instructing the printing by voice with respect to the smart speaker, it is assumed that the print result cannot be confirmed in advance. Further, since it is difficult to designate the printed material by the printing by voice, it is considered to print the fixed print contents held in the cloud print service in order or randomly. In this case, since the user does not know which content was selected until the print result is confirmed, it is assumed that printing of the content different from intention of the user is repeated until the printed material desired by the user is obtained.

In order to satisfy the needs of the user who performs the print instruction with respect to the smart speakers these days, it is necessary to have a mechanism for suppressing unnecessary printing that is not intended by the user. The present technology enables the user to confirm the print result in advance by displaying the print preview screen on the display section in response to the conditions before actual printing, and can suppress wasteful printing.

Hereinafter, a specific example of the present technology will be described.

(3) Specific Example of Configuration of Printing System

FIG. 1 schematically illustrates a specific example of the configuration of the system including the printing system SY1. The system illustrated in FIG. 1 includes the information processing apparatus 100, the printer 200, the smart speaker 300 in which the display section 350 is integrated, the voice intermediary apparatus 400, and a terminal 500. The printing system SY1 includes the information processing apparatus 100 and the printer 200. The information processing apparatus 100, the printer 200, the smart speaker 300, the voice intermediary apparatus 400, and the terminal 500 are coupled to the network NE1 including the Internet. The network NE1 including the Internet may include a LAN. Here, the LAN is an abbreviation for local area network. The coupling to the network NE1 may be wired coupling, wireless coupling, or both wired and wireless coupling. The information processing apparatus 100 is a server computer that provides a function called a cloud print service, and opens a function called a voice UI to the voice intermediary apparatus 400. Here, the UI is an abbreviation for user interface. The information processing apparatus 100 transmits the print data DA1 based on the keyword KE0 from the voice intermediary apparatus 400 to the printer 200. The printer 200 is a printing apparatus that forms a print image according to the print data DA1 from the information processing apparatus 100. The smart speaker 300 is a voice input/output apparatus that uses a function of a voice recognition service provided by the voice intermediary apparatus 400. The voice intermediary apparatus 400 is a server computer that provides a voice recognition service using AI. Here, AI is an abbreviation for artificial intelligence.

In the following description, "voice UI" means a part that performs a function of the voice UI in the information processing apparatus 100, and "cloud print service" means a part that performs a function of a cloud print service in the information processing apparatus 100.

The information processing apparatus 100 has a voice UI area 110 that is a storage area of information for realizing the voice UI, and a print service area 120 that is a storage area of information for realizing the cloud print service. The voice UI is a service built on a platform of the voice recognition service by a provider of the cloud print service. The voice UI area 110 includes an information area for realizing an information acquisition section 111 including the keyword acquisition section 112. The information acquisition section 111 may acquire user identification information UID for identifying the user US0, voice input/output apparatus identification information SID for identifying the smart speaker 300, display section identification information DID for identifying the display section 350, and the like, in addition to the keyword KE0 included in the print instruction by voice. Here, the user US0 illustrated in FIG. 1 is a general term for users US1 and US2. The print service area 120 includes an information area for realizing a storage section 121 that stores management information IM1 and print setting registration information IM2, a management information update section 122, the preview processing section 123, a setting reception section 124, and the print data transmission section 125. It is needless to say that the voice UI and the cloud print service may be built on different computers. In addition, the voice UI may be built on a server computer that provides a voice recognition service.

For example, when the user US2 utters "print recommended photo", the smart speaker 300 converts the voice from the user US2 into a digital voice signal SG1 and transmits the voice signal SG1 via the network NE1 to the voice intermediary apparatus 400. The voice intermediary apparatus 400 that received the voice signal SG1 identifies the user US2, analyzes the voice based on the voice signal SG1, and requests printing to the voice UI when a request keyword such as "print" is included in the voice, and delivers the user identification information UID corresponding to the user US2 and the keyword KE0 such as "recommended photo" included in the voice to the voice UI. The voice intermediary apparatus 400 may identify the user US2 by analyzing the voice based on the voice signal SG1, or may identify the user US2 based on the voice input/output apparatus identification information SID received from the smart speaker 300 and a predetermined keyword. "print request {user ID} {recommended_photo}" illustrated in FIG. 1 illustrates an example of a request including the user identification information UID and the keyword KE0. "{userID}" means the user identification information UID. "{recommended_photo}" means the keyword KE0 such as "recommended photo". The voice UI that received the user identification information UID and the keyword KE0 issues a print request for the content CO1 specified by the keyword KE0 and the user identification information UID as necessary to the cloud print service. The cloud print service that received the print request specifies the content CO1 to be printed based on the keyword KE0 and the user identification information UID as necessary.

When issuing the print preview screen D1 of the content CO1, the cloud print service displays the print preview screen D1 on the display section 350. When the display section 350 is integrated with the smart speaker 300, the cloud print service outputs a display request RE2 for the print preview screen D1 to the voice intermediary apparatus 400 via the voice UI. The voice intermediary apparatus 400 that received the display request RE2 generates the display signal SG2 of the print preview screen D1 and transmits the display signal SG2 to the smart speaker 300. The smart speaker 300 that received the display signal SG2 displays the print preview screen D1 on the display section 350 based on the display signal SG2. Further, the cloud print service can receive registration of the terminal 500 including a display panel 525 to be the display section 350. In this case, the cloud print service also outputs the display request RE2 of the print preview screen D1 to the voice intermediary apparatus 400 via the voice UI. The voice intermediary apparatus 400 transmits the data of the print preview screen D1 to the terminal 500. Accordingly, the terminal 500 can display the print preview screen D1 on the display panel 525.

Further, by installing the application program for displaying the print preview screen D1 in the terminal 500, the cloud print service can transmit the data of the print preview screen D1 to the terminal 500 without going through the voice intermediary apparatus 400. Furthermore, the cloud print service may transmit the data of the print preview screen D1 to the printer 200 without going through the voice intermediary apparatus 400. In this case, the printer 200 can display the print preview screen D1 on a display panel 225.

In any case, the user can also see the print preview screen D1 corresponding to the content CO1.

When the user US2 who saw the print preview screen D1 utters, for example, "print start", the smart speaker 300 converts the voice "print start" into the voice signal SG1, and the voice signal SG1 is transmitted to the voice intermediary apparatus 400 via the network NE1. The voice intermediary apparatus 400 that received the voice signal SG1 analyzes the voice based on the voice signal SG1 and delivers the keyword KE0 "print start" to the voice UI. The voice UI issues a request corresponding to "print start" to the cloud print service. The cloud print service generates the print data DA1 using the content CO1 and transmits the print data DA1 to the printer 200 via the network NE1. The printer 200 that received the print data DA1 executes printing according to the print data DA1. Accordingly, the content CO1 of "recommended photo" uttered by the user US2 is printed. In addition, not being limited to the target of printing by the keyword KE0, by uttering "print recommended photo with printer manufactured by company A", the printer 200 that assumes the user US2 as an output destination may be designated.

Furthermore, the request keyword for printing is not limited to "print" and various similar variations, such as "perform printing", can be considered. Therefore, the processing with respect to the voice including these variations may be similar to the processing with respect to the voice including the request keyword "print".

Further, there is a case where the voice UI issues a confirmation request RE1 for requesting confirmation to the user, to the voice intermediary apparatus 400. The voice intermediary apparatus 400 that received the confirmation request RE1 can output the voice for requesting the confirmation to the smart speaker 300. Furthermore, there is a case where the voice UI issues the read-aloud request RE3 for reading the voice including the print setting PS1 to the voice intermediary apparatus 400. The voice intermediary apparatus 400 that received the read-aloud request RE3 can output the voice including the print setting PS1 to the smart speaker 300.

FIG. 2 schematically illustrates the configuration of the information processing apparatus 100. Although the information processing apparatus 100 illustrated in FIG. 2 is one server computer having the voice UI area 110 and the print service area 120, the information processing apparatus may be configured of a plurality of server computers coupled to each other. For example, the information processing apparatus may have a configuration in which a server computer having the voice UI area 110 and a server computer having the print service area 120 are separately provided. Further, the voice UI area 110 may be built in the server computer that provides the voice recognition service, and in this case, the information processing apparatus 100 including the voice UI area 110 and the print service area 120 is also configured.

The information processing apparatus 100 illustrated in FIG. 2 includes a CPU 101 that is a processor, a ROM 102 that is a semiconductor memory, a RAM 103 that is a semiconductor memory, a storage apparatus 104, an input apparatus 105, a display apparatus 106, a network I/F 107, a clock circuit 108, and the like. The elements 101 to 108 and the like can input and output information to and from each other by being electrically coupled to each other. Here, the CPU is an abbreviation for Central Processing Unit, the ROM is an abbreviation for Read Only Memory, the RAM is an abbreviation for Random Access Memory, and the I/F is an abbreviation for interface.

The storage apparatus 104 stores an OS (not illustrated) and the like, and has the areas 110 and 120 described above.

Here, the OS is an abbreviation for operating system. The voice UI area 110 stores a program or the like that causes the information processing apparatus 100 to realize an information acquisition function FU1 including the keyword acquisition function Ful1. The print service area 120 includes the storage section 121 that stores the management information IM1 and the print setting registration information IM2, and stores a program and the like that causes the information processing apparatus 100 to realize a plurality of functions FU2 to FU5. The information processing program PR1 includes a program that causes the information processing apparatus 100 to realize the above-described functions FU1 to FU5. The information stored in the storage apparatus 104 is appropriately read into the RAM 103 and used in the processing for causing the printer 200 to execute printing. As the storage apparatus 104, a magnetic storage apparatus such as a hard disk, a non-volatile semiconductor memory such as a flash memory, or the like can be used.

As the input apparatus 105, a pointing device, a hard key including a keyboard, a touch panel attached to the surface of the display panel, or the like can be used. A liquid crystal display panel or the like can be used as the display apparatus 106. The network I/F 107 is coupled to the network NE1 and communicates with a partner apparatus connected to the network NE1 according to a predetermined communication standard. The clock circuit 108 can output the current date and time.

By executing the information processing program PR1 read from the storage apparatus 104 to the RAM 103, the CPU 101 performs an information acquisition processing corresponding to the information acquisition function FU1, registration processing corresponding to the management information update function FU2, preview processing corresponding to the preview processing function FU3, setting receiving processing corresponding to the setting reception function FU4, and transmitting processing corresponding to the print data transmission function FU5. The information processing program PR1 causes the information processing apparatus 100, which is a computer, to function as the information acquisition section 111 corresponding to the information acquisition function FU1, the management information update section 122 corresponding to the management information update function FU2, the preview processing section 123 corresponding to the preview processing function FU3, the setting reception section 124 corresponding to the setting reception function FU4, and the print data transmission section 125 corresponding to the print data transmission function FU5. As illustrated in FIGS. 8 and 10, the information processing apparatus 100 that executes the information processing program PR1 includes an information acquiring step ST1, a management information updating step ST2, a preview processing step ST3, a setting receiving step ST4, a print data generating step ST5, a print data transmitting step ST6, and a printing step ST7. The computer-readable medium storing the information processing program PR1 is not limited to the storage apparatus 104 and may be a recording medium which is on the outside of the information processing apparatus 100.

FIG. 3 schematically illustrates the structure of the management information IM1 stored in the storage section 121. In the management information IM1 illustrated in FIG. 3, a user ID is stored, and further, a smart speaker ID, a display ID, a preview output destination, a preview display setting, and a printer ID are stored in a state of being associated with the user ID. Here, the ID is an abbreviation of identifier and includes identification for a person. The user ID means user identification information UID that identifies the user US0. It is assumed that the cloud print service manages different user identification information UID for each user while cooperating with the voice intermediary apparatus 400. The smart speaker ID means voice input/output apparatus identification information SID that identifies the smart speaker 300 managed by the voice intermediary apparatus 400. The display ID means display section identification information DID for identifying the display section 350. The preview output destination means display destination information IM11 indicating whether to output the display request RE2 for displaying the print preview screen D1 on the display section 350 to the voice intermediary apparatus 400. The preview display setting means display setting information IM12 indicating whether to display the print preview screen D1. The printer ID means printing apparatus identification information PID that identifies the printer 200.

FIG. 4 schematically illustrates the structure of the print setting registration information IM2 stored in the storage section 121. In the print setting registration information IM2 illustrated in FIG. 4, the printer ID is stored, and further, the user ID and the print setting PS1 are stored. The print setting registration information IM2 may not have the user ID. There is a case where the print setting PS1 is the default setting indicated by "(default)" and there is a case where the print setting PS1 is a setting changed by the user US0. For example, the default setting is A4 size, portrait orientation, color printing, and standard image quality. The print setting for the user ID "UID-4" is changed from the default setting to A3 size, landscape orientation, and high image quality. Furthermore, the "actual size" means a setting for printing with the actual size of the content CO1 even when the content CO1 has a size that exceeds the paper or an extremely small size. "fit to paper" is a print setting for reducing the size of the content CO1 to a size that fits to the paper even when the content CO1 has a size that exceeds the paper.

When the user US0 uses the cloud print service to cause the printer 200 to execute printing, it is necessary to perform user registration for the printer 200 in the cloud print service. For example, the cloud print service may display a user registration screen on the display panel 525 of the terminal 500 and receive the input of the printing apparatus identification information PID and the user identification information UID from the terminal 500 by the operation of the user US0. In this case, the cloud print service stores the printing apparatus identification information PID as the printer ID in the print setting registration information IM2, and may further store the user identification information UID as the user ID in the print setting registration information IM2 in a state of being associated with the print setting registration information IM2. The initial print setting is the default setting. Further, the cloud print service may receive the input of the identification information PID and UID from the printer 200 by the operation of the user US0, or may receive the input of the identification information PID and UID from the smart speaker 300 via the voice intermediary apparatus 400 by the voice instruction or the operation of the user US0.

FIG. 5 schematically illustrates the structure of a keyword table TA1 stored in the storage section 121. A plurality of keywords KE0 are stored in the keyword table TA1. The plurality of keywords KE0 include keywords KE1 to KE6 according to the usage scene in addition to the keywords to be combined with the request keyword "print".

Each keyword combined with the request keyword "print" is associated with the content CO1 to be printed. Photo 1, Photo 2, . . . are associated with the keyword "recommended photo" illustrated in FIG. 5. An external address is associated with the keyword "usual news" illustrated in FIG. 5. In this case, the cloud print service performs processing of acquiring the content CO1 from the external address, and displaying the print preview screen D1 of the content CO1 or generating the print data DA1. The latest coloring line in the print history is associated with the keyword "coloring line before this" illustrated in FIG. 5. The cloud print service performs processing of specifying the content CO1 corresponding to the latest coloring line from the print history stored in the storage section 121, and displaying the print preview screen D1 of the content CO1 or generating the print data DA1.

The print start keyword KE1 illustrated in FIG. 5 is a keyword for starting printing of the content CO1 corresponding to the print preview screen D1, and includes, for example, "print start", "print execution", and the like.

The print setting keyword KE2 illustrated in FIG. 5 is a keyword for instructing the print setting PS1 of the content CO1 and includes, for example, "A3", "vertical", "color", "high image quality" and the like.

The display change keyword KE3 illustrated in FIG. 5 is a keyword for instructing the display change for the print preview screen D1 displayed on the display section 350, and includes, for example, "enlarge", "reduce", "page turning", and the like. "page turning" means to switch the display from the current page to the next page when the print preview screen D1 has a plurality of pages.

The selection keyword KE4 illustrated in FIG. 5 is a keyword for selecting any one of the plurality of thumbnails D2 (refer to FIG. 16) included in the print preview screen D1, and includes, for example, "first", "second", "third", and the like.

The thumbnail display keyword KE5 illustrated in FIG. 5 is a keyword for displaying the print preview screen D1 including two or more thumbnails D2, and includes, for example, "thumbnail display", "others", and the like.

The print cancellation keyword KE6 illustrated in FIG. 5 is a keyword for canceling printing, and includes, for example, "print cancellation", "cancel", and the like.

Figure 6:
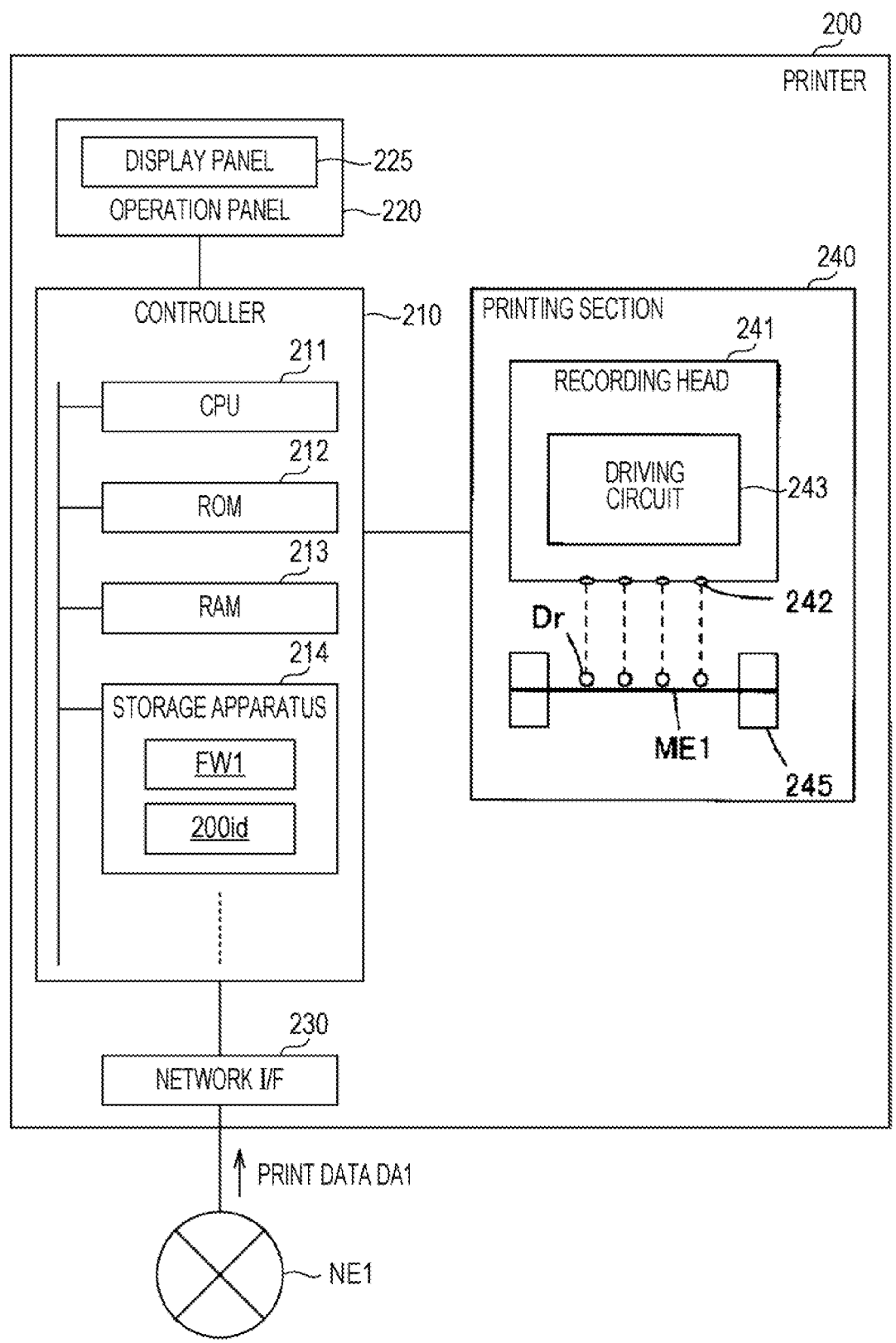
FIG. 6 is a block diagram schematically illustrating a configuration example of a printing apparatus.

FIG. 6 schematically illustrates the configuration of the printer 200. The printer 200 illustrated in FIG. 6 is a printing apparatus capable of executing printing according to the print data DA1 received via the network NE1. The printer 200 that can be used in the printing system SY1 is not particularly limited to an electrophotographic printer such as an ink jet printer or a laser printer. It is needless to say that the printer 200 may be a copying machine, a facsimile, a multi-function peripheral having these functions, or the like. FIG. 6 illustrates the configuration of the printer 200 in a case of an ink jet printer.

The printer 200 illustrated in FIG. 6 includes a controller 210, an operation panel 220, a network I/F 230, and a printing section 240.

The controller 210 has a CPU 211, a ROM 212, a RAM 213, a storage apparatus 214, and the like. The elements 211 to 214 and the like can input and output information to and from each other by being electrically coupled to each other. In other words, the printer 200 is also a type of computer. The storage apparatus 214 stores firmware FW1 that causes a computer to function as the printer 200, printer identification information 200id for individually identifying the printer 200, and the like. A mail address, an IP address, a serial number, or the like can be used as the printer identification information 200id. Here, the IP address is an abbreviation for Internet protocol address. As the storage apparatus 214, a non-volatile semiconductor memory such as a flash memory, a magnetic storage apparatus such as a hard disk, or the like can be used. The printer identification information 200id is information that can be the printer ID illustrated in FIGS. 3 and 4.

The operation panel 220 includes the display panel 225, an operation input section (not illustrated), and the like, and receives an operation by the user. The display panel 225 is configured of, for example, a liquid crystal panel, and displays information indicating the state of the printer 200, information indicating an instruction from the user, and the like. In addition, by registering the printer 200 in the preview output destination illustrated in FIG. 3, the display panel 225 can display the print preview screen D1. The operation input section includes a plurality of operation keys including, for example, a cursor key and a determination key. Further, the operation input section may be a touch panel or the like that receives an operation on the display panel 225.

The network I/F 230 is coupled to the network NE1 and communicates with a partner apparatus connected to the network NE1 according to a predetermined communication standard.

The printing section 240 includes a recording head 241 that ejects liquid droplets Dr such as ink drops onto a print substrate, and a paper feeding section 245 that transports a print substrate ME1. The recording head 241 includes a plurality of nozzles 242 that eject the droplets Dr, and a driving circuit 243 that ejects the droplets Dr from each nozzle 242. As the driving circuit 243, a circuit for driving a piezoelectric element that applies a pressure to the liquid in a pressure chamber that communicates with each nozzle 242, a circuit driving a thermal element that generates bubbles in the liquid in each pressure chamber by heat, and the like can be used. By the droplets Dr landing on the print substrate ME1 transported by the paper feeding section 245, a print image corresponding to the print data DA1 from the information processing apparatus 100 is formed on the print substrate ME1.

Furthermore, the print substrate is a material that holds the print image. Paper, resin, metal, or the like can be used as the print substrate. The shape of the print substrate is generally a rectangle or a roll, but may be a substantially circular shape such as an optical disk, a polygon other than a rectangle, a three-dimensional shape, or the like.

Figure 7:
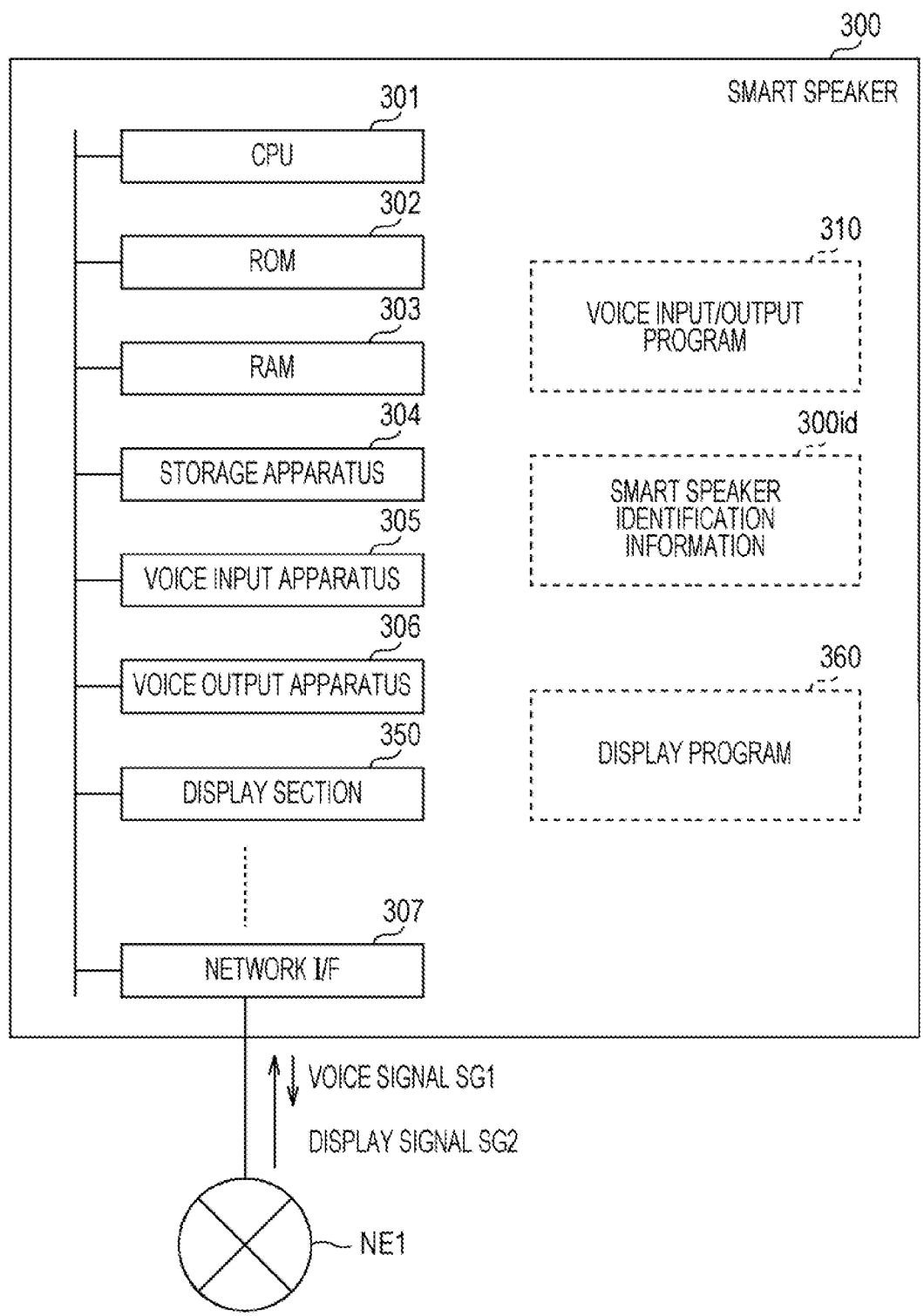
FIG. 7 is a block diagram schematically illustrating a configuration example of a voice input/output apparatus.

FIG. 7 schematically illustrates the configuration of the smart speaker 300 that uses the voice recognition service by the voice intermediary apparatus 400. The smart speaker 300 illustrated in FIG. 7 includes a CPU 301, a ROM 302, a RAM 303, a storage apparatus 304, a voice input apparatus 305, a voice output apparatus 306, a network I/F 307, a display section 350, and the like. The elements 301 to 307, 350 and the like can input and output information to and from each other by being electrically coupled to each other. In other words, the smart speaker 300 is also a type of computer. The storage apparatus 304 stores a voice input/output program 310 that causes a computer to function as the smart speaker 300, smart speaker identification information 300id for individually identifying the smart speaker 300, a display program 360 that controls the display of the display section 350, and the like. Furthermore, the display section identification information for identifying the display section 350 of the smart speaker 300 is the smart speaker identification information 300id. The smart speaker identification information 300id is information that can be the smart speaker ID illustrated in FIG. 3 and information that can be the display ID illustrated in FIG. 3. As the storage apparatus 304, a non-volatile semiconductor memory such as a flash memory, a magnetic storage apparatus such as a hard disk, or the like can be used.

The voice input apparatus 305 has a microphone, converts voice input from the outside into an analog electric signal by the microphone, and converts this electric signal into a digital voice signal SG1. The number of voice input apparatuses 305 provided in the smart speaker 300 may be one or may be two or more. The voice output apparatus 306 has a speaker in a narrow sense for converting an electric signal into sound, converts the digital voice signal SG1 into an analog electric signal, converts this electric signal into voice with the speaker, and outputs the voice to the outside. The number of voice output apparatuses 306 provided in the smart speaker 300 may be one or may be two or more. The network I/F 307 is coupled to the network NE1 and communicates with a partner apparatus connected to the network NE1 according to a predetermined communication standard.

The display section 350 includes, for example, a liquid crystal panel, and displays information indicating the state of the smart speaker 300, the print preview screen D1, and the like. By registering the voice intermediary apparatus 400 in the preview output destination illustrated in FIG. 3, the display section 350 can display the print preview screen D1. Further, the display section 350 may be a touch panel or the like that receives an operation on the surface.

Furthermore, the voice intermediary apparatus 400 is a server computer, and has, for example, a CPU, a ROM, a RAM, a storage apparatus, an input apparatus, a display apparatus, a network I/F, and the like. The terminal 500 has, for example, a CPU, a ROM, a RAM, a storage apparatus, an input apparatus, a display panel 525, a network I/F, and the like. As the terminal 500, a mobile terminal such as a smartphone or a tablet terminal, a personal computer, or the like can be used.

(4) Specific Example of System Processing

FIG. 8 schematically illustrates management information registration processing performed by the cloud print service of the information processing apparatus 100. Here, display setting information acquisition processing of step S112 corresponds to the setting receiving step ST4, the setting reception section 124, and the setting reception function FU4. Management information updating processing of step S118 corresponds to the management information updating step ST2, the management information update section 122, and the management information update function FU2. Hereinafter, the description of "step" will be omitted, and the reference numerals of each step will be illustrated in parenthesis. When the user US0 registers the management information IM1 by using the smart speaker 300, the voice intermediary apparatus 400 requests a management information registration screen to the voice UI in response to the utterance of the user US0 via the smart speaker 300. When the user US0 registers the management information IM1 by using the terminal 500, the terminal 500 requests the management information registration screen to the cloud print service in response to the operation of the user US0.

The cloud print service outputs the management information registration screen (not illustrated) in response to the request for the management information registration screen (S102). The management information registration screen is a user interface for adding information to each item of the management information IM1 illustrated in FIG. 3. For example, when the user US0 instructs the smart speaker 300 to display the management information registration screen by voice, the voice intermediary apparatus 400 issues a request for the management information registration screen to the voice UI. When receiving the request for the management information registration screen from the voice intermediary apparatus 400 via the voice UI, the cloud print service outputs the management information registration screen to the voice intermediary apparatus 400 via the voice UI. Accordingly, the management information registration screen is displayed on the display section 350 of the smart speaker 300. Further, when receiving the request for the management information registration screen from the terminal 500, the cloud print service transmits the management information registration screen to the terminal 500. Accordingly, the management information registration screen is displayed on the display panel 525 of the terminal 500. Hereinafter, the voice intermediary apparatus 400 and the terminal 500 are collectively referred to as external apparatuses 400 and 500.

After outputting the management information registration screen, the cloud print service receives the input of the user ID illustrated in FIG. 3 from the external apparatuses 400 and 500 (S104). For example, when the user US0 instructs the smart speaker 300 to display the management information registration screen, the voice intermediary apparatus 400 delivers the user identification information UID corresponding to the user US0 to the voice UI. Therefore, the cloud print service may acquire the user identification information UID as a registration user ID from the voice UI. Further, the cloud print service may acquire the user identification information UID input in a user ID input field of the management information registration screen as the registration user ID.

Further, the cloud print service receives the input of the smart speaker ID illustrated in FIG. 3 from the external apparatuses 400 and 500 (S106). For example, the smart speaker 300 transmits the voice input/output apparatus identification information SID to the voice intermediary apparatus 400, and the voice intermediary apparatus 400 delivers the voice input/output apparatus identification information SID from the smart speaker 300 to the voice UI. Therefore, the cloud print service may acquire the voice input/output apparatus identification information SID from the voice UI as a registration smart speaker ID. Further, the cloud print service may acquire the voice input/output apparatus identification information SID input in the smart speaker ID input field of the management information registration screen as the registration smart speaker ID.

Furthermore, the cloud print service receives the input of the display ID illustrated in FIG. 3 from the external apparatuses 400 and 500 (S108). For example, when the display section 350 is provided, the smart speaker 300 transmits the equipment information indicating that the display section 350 is provided to the voice intermediary apparatus 400 together with the voice input/output apparatus identification information SID. Since the voice intermediary apparatus 400 that received the equipment information delivers the voice input/output apparatus identification information SID as the display section identification information DID to the voice UI, the cloud print service may acquire the display section identification information DID from the voice UI as the registration display ID. Further, the cloud print service may acquire the display section identification information DID input in a display ID input field of the management information registration screen as the registration display ID.

Furthermore, the cloud print service acquires the display destination information IM11 indicating the preview output destination illustrated in FIG. 3 (S110). The display destination information IM11 indicates whether to output the display request RE2 for displaying the print preview screen D1 on the display section 350 to the voice intermediary apparatus 400. For example, when the voice intermediary apparatus 400 delivers the display section identification information DID to the voice UI, the cloud print service acquires the display destination information "voice intermediary apparatus". Therefore, when the information from the voice intermediary apparatus 400 includes the display section identification information DID, the preview output destination is set to the voice intermediary apparatus 400. Therefore, the preview processing section 123 determines that the voice intermediary apparatus 400 can display a screen on the display section 350 when the information from the voice intermediary apparatus 400 includes the display section identification information DID, and outputs the display request RE2 to the voice intermediary apparatus 400.

Furthermore, the cloud print service acquires the display setting information IM12 indicating the preview display setting illustrated in FIG. 3 (S112). The display setting information IM12 indicates whether to display the print preview screen D1. For example, when the user US0 issues the voice instruction for displaying the print preview screen D1 to the smart speaker 300, the voice intermediary apparatus 400 delivers the display setting information "display" to the voice UI. In this case, the cloud print service acquires the display setting information "display" from the voice intermediary apparatus 400 via the voice UI. The display setting information "display" is an example of a first setting for displaying the print preview screen D1. In addition, when the user US0 issues the voice instruction for not displaying the print preview screen D1 to the smart speaker 300, the voice intermediary apparatus 400 delivers the display setting information "not display" to the voice UI. In this case, the cloud print service acquires the display setting information "not display" from the voice intermediary apparatus 400 via the voice UI. The display setting information "not display" is an example of a second setting for not displaying the print preview screen D1. Furthermore, the cloud print service may receive the display setting information IM12 from the terminal 500.

Furthermore, the cloud print service acquires the printing apparatus identification information PID indicating the printer ID illustrated in FIG. 3 (S114). For example, the cloud print service may acquire the printing apparatus identification information PID associated with the registration user ID from the print setting registration information IM2 illustrated in FIG. 4 for registration. Further, the cloud print service may acquire the printing apparatus identification information PID input in a printer ID input field of the management information registration screen for registration.

The cloud print service performs the above-described processing of S104 to S114 any number of times in order until the end of registration is instructed (S116). The determination processing of S116 can be performed, for example, depending on whether or not the operation of a registration end button included in the management information registration screen is received. Further, the determination processing of S116 may be performed depending on whether or not the keyword that means the end of registration is delivered from the voice intermediary apparatus 400.

After the instruction for ending the registration, the cloud print service updates the management information IM1 by storing the information acquired in the processing of S104 to S114 in the management information IM1 (S118). The information which is not acquired in the processing of S104 to S114 is not stored in the management information IM1. For example, in the management information IM1 illustrated in FIG. 3, the display section identification information DID and the display destination information IM11 are not associated with the user ID "UID-3". When the external apparatus is the voice intermediary apparatus 400, the cloud print service updates the management information IM1 based on the information from the voice intermediary apparatus 400.

After the management information updating processing in S118, the cloud print service ends the management information registration processing.

Figure 9:
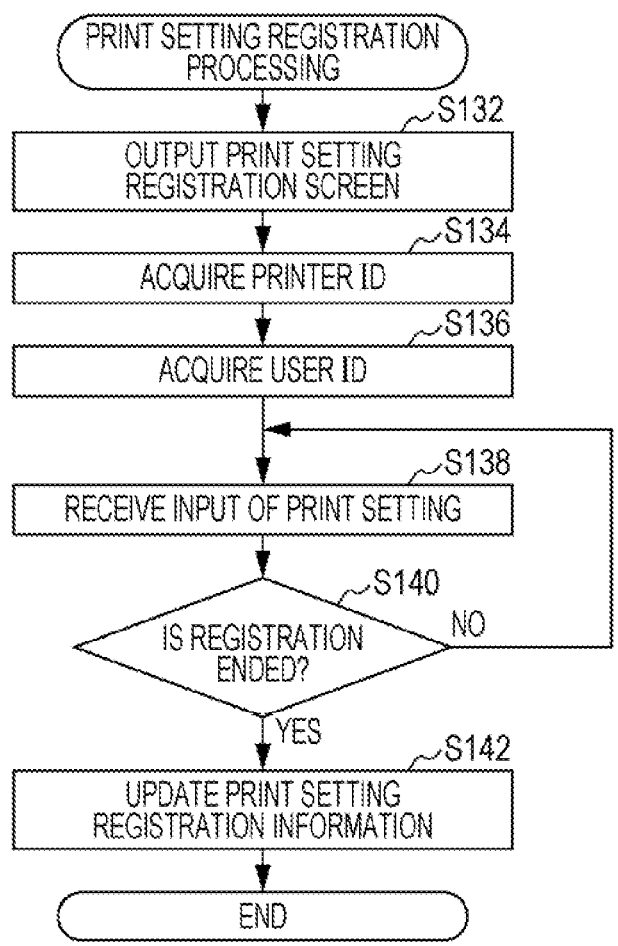
FIG. 9 is a flowchart schematically illustrating an example of print setting registration processing.

FIG. 9 schematically illustrates print setting registration processing performed by the cloud print service of the information processing apparatus 100. The print setting registration processing is processing of updating the print setting PS1 of the print setting registration information IM2 illustrated in FIG. 4. When the print setting registration processing starts, the cloud print service displays a print setting registration screen on the display panel 525 of the terminal 500, for example (S132). The cloud print service acquires the printing apparatus identification information PID corresponding to the printer 200 to be used as the printer ID (S134), and acquires the user identification information UID corresponding to the user US0 as the user ID (S136). After this, the cloud print service displays the print setting PS1 corresponding to the combination of the printing apparatus identification information PID and the user identification information UID in the print setting registration information IM2 on the display panel 525, and receives the input of the print setting PS1 (S138). The receiving processing of S138 is performed until the end of registration is instructed (S140). The determination processing of S140 can be performed, for example, depending on whether or not the operation of a registration end button included in the print setting registration screen is received. When the end of registration is instructed, the cloud print service updates the print setting PS1 corresponding to the combination of the printing apparatus identification information PID and the user identification information UID in the print setting registration information IM2 (S142), and ends the print setting registration processing. The print setting registration information updating processing of S142 is processing of replacing the print setting PS1 corresponding to the combination of the identification information PID and UID with the print setting received in S138.

For example, when the user with the user ID "UID-4" updates the default setting to the print settings illustrated in FIG. 4, the user may perform an input for changing A4 size, portrait orientation, and standard image quality to A3 size, landscape orientation, and high image quality with respect to the print setting registration screen. In this case, the cloud print service receives an update request for A3 size, landscape orientation, and high image quality from the terminal 500. Therefore, the cloud print service may perform processing of replacing A4 size, portrait orientation, and standard image quality with A3 size, landscape orientation, and high image quality, with respect to the print setting PS1 corresponding to the combination of the printer ID "PID-4" and the user ID "UID-4".

Further, the cloud print service may receive the input of the print setting PS1 from the printer 200 by the operation of the user US0, or may receive the input of the print setting PS1 from the smart speaker 300 via the voice intermediary apparatus 400 by the voice instruction or the operation of the user US0.

FIG. 10 schematically illustrates processing until printing is executed by voice input in a system including the printing system SY1. As described above, "voice UI" means a part that performs a function of the voice UI in the information processing apparatus 100, and "cloud print service" means a part that performs a function of a cloud print service in the information processing apparatus 100. The process after S206 illustrates processing when the voice having the request keyword "print" is input to the smart speaker 300. Here, S206 corresponds to the information acquiring step ST1 including the keyword acquiring step ST11, the information acquisition section 111 including the keyword acquisition section 112, and the information acquisition function FU1 including the keyword acquisition function FU11. S214 to S218 and S228 to S230 correspond to the preview processing step ST3, the preview processing section 123, and the preview processing function FU3. S208 to S212 and S228 to S232 correspond to the print data generating step ST5. S234 to S236 correspond to the print data transmitting step ST6. S208 to S212 and S228 to S234 correspond to the print data transmission section 125 and the print data transmission function FU5. S238 corresponds to the printing step ST7.

In FIG. 10, the display setting for the print preview screen D1 may be a setting for displaying the print preview screen D1 according to the instructed print setting when the print setting keyword KE2 for instructing the print setting of the content CO1 is included in the print instruction, and displaying the print preview screen D1 according to the predetermined setting when the print setting keyword KE2 is not included in the print instruction. The predetermined setting is the print setting PS1 stored in the print setting registration information IM2 illustrated in FIG. 4, and is the default setting or the setting changed by the user.

Figure 16:
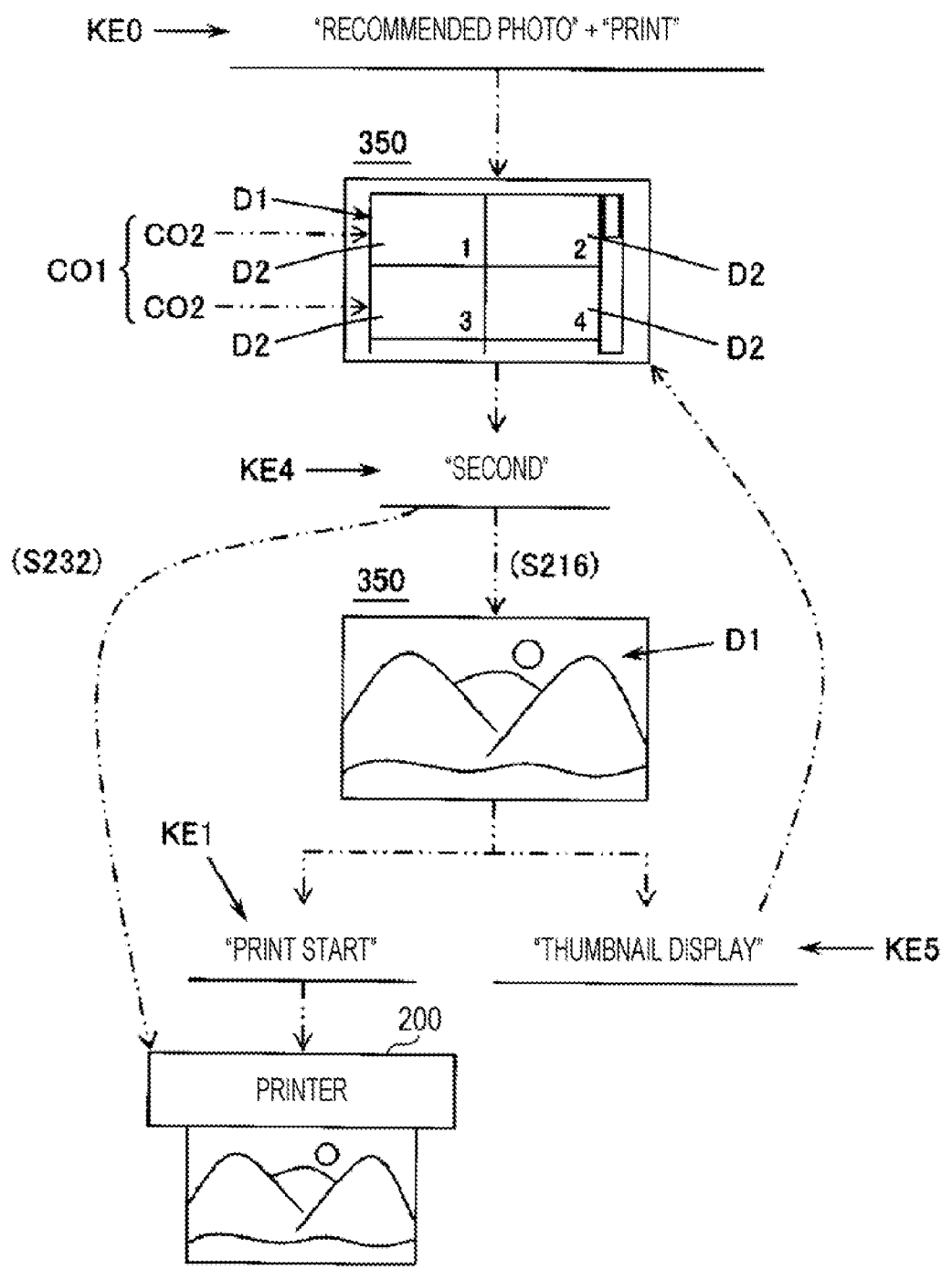
FIG. 16 is a diagram schematically illustrating an example of the print preview screen and printing.

In addition, as illustrated in FIG. 16, the above-described display setting is also a setting for displaying the print preview screen D1 including at least two or more thumbnails among the plurality of thumbnails D2 corresponding to the plurality of candidate contents CO2 when the content CO1 includes the plurality of candidate contents CO2.

When the user US0 utters regarding the printing to the smart speaker 300, the smart speaker 300 converts the voice from the user US0 into the voice signal SG1 and transmits the voice signal SG1 via the network NE1 to the voice intermediary apparatus 400 (S202). The voice intermediary apparatus 400 that received the voice signal SG1 delivers the user identification information UID and the keyword KE0 to the voice UI, and requests the voice UI for processing (S204). Here, the voice intermediary apparatus 400 acquires the user identification information UID corresponding to the user US0, analyzes the voice based on the voice signal SG1, and extracts the keyword KE0 other than the request keyword from the voice analysis result. The keyword KE0 is a keyword included in the print instruction by voice. The print instruction may include a keyword that specifies the printer 200.

The voice intermediary apparatus 400 may store the user identification information UID for each user in the storage apparatus, and may store the information indicating the characteristics of the voice for each user in the storage apparatus in association with the user identification information UID. The characteristics of the voice that identifies the user can be represented by, for example, the frequency distribution of the voice. Therefore, the voice intermediary apparatus 400 may obtain the frequency distribution of the voice based on the voice signal SG1, acquire the user identification information UID associated with the frequency distribution closest to this frequency distribution from the storage apparatus, and deliver the user identification information UID to the voice UI. In addition, the smart speaker 300 may receive a voice input of the name of the user US0, and the voice intermediary apparatus 400 may extract the name of the user US0 based on the voice signal SG1 to acquire the user identification information UID associated with the name from the storage apparatus and deliver the user identification information UID to the voice UI.

The voice UI acquires the user identification information UID and the keyword KE0 included in the print instruction by voice from the voice intermediary apparatus 400 (S206). In addition, the voice UI issues a content print request including the acquired user identification information UID and the acquired keyword KE0 to the cloud print service (S208). The cloud print service that received the content print request performs processing of specifying the content CO1 to be printed based on the acquired user identification information UID and the acquired keyword KE0 (S210). The content CO1 may include the plurality of candidate contents CO2 as illustrated in FIG. 16. In addition, the cloud print service performs print setting acquisition processing for acquiring the print setting PS1 associated with the printing apparatus identification information PID corresponding to the printer 200 used by the user US0 (S212). When the keyword for specifying the printer 200 is included in the print instruction, the cloud print service acquires the printing apparatus identification information PID corresponding to the keyword for specifying the printer 200. When the keyword for specifying the printer 200 is not included in the print instruction, the cloud print service acquires the printing apparatus identification information PID associated with the user identification information UID from the print setting registration information IM2 illustrated in FIG. 4.

Figure 11:
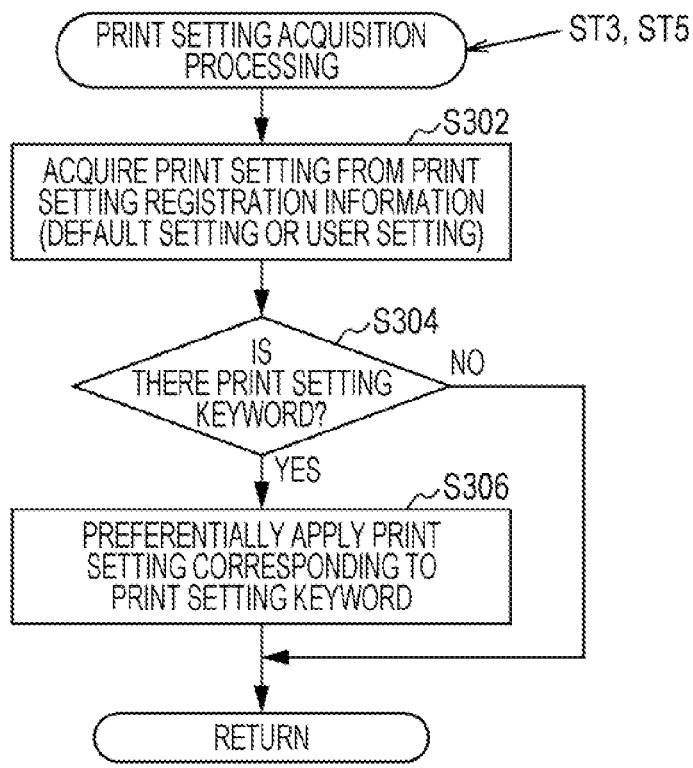
FIG. 11 is a flowchart schematically illustrating an example of print setting acquisition processing.

FIG. 11 schematically illustrates the print setting acquisition processing performed in S212 of FIG. 10. When the print setting acquisition processing starts, the cloud print service acquires the print setting corresponding to the combination of the printing apparatus identification information PID and the user identification information UID from the print setting registration information IM2 illustrated in FIG. 4 (S302). The acquired print setting is the default setting or the setting changed by the user US0. After acquiring the print setting, the cloud print service branches the processing depending on whether or not the print setting keyword KE2 is included in the print instruction (S304). When the print setting keyword KE2 is included in the print instruction, the cloud print service preferentially applies the print setting corresponding to the print setting keyword KE2 (S306), and ends the print setting acquisition processing. When the print setting keyword KE2 is not included in the print instruction, the cloud print service applies the print setting acquired from the print setting registration information IM2, and ends the print setting acquisition processing.

As described above, when the print setting keyword KE2 is included in the print instruction, the instructed print setting is applied, and when the print setting keyword KE2 is not included in the print instruction, the print setting of the print setting registration information IM2 is applied.

After S212 of FIG. 10, the cloud print service performs a preview display determination processing of determining whether to display the print preview screen D1 (S214).

FIG. 12 schematically illustrates the preview display determination processing performed in S214 of FIG. 10. When the preview display determination processing starts, the cloud print service branches the processing depending on whether or not the display section identification information DID is associated with the user identification information UID in the management information IM1 illustrated in FIG. 3 (S402). When there is no display section identification information DID, the display section 350 that displays the print preview screen D1 is not specified, and thus, the cloud print service determines not to display the print preview screen D1 (S414), and ends the preview display determination processing. Therefore, the preview processing section 123 determines that it is possible to display a screen on the display section 350 when the display section identification information DID is associated with the user identification information UID in the management information IM1, and otherwise, determines that the screen cannot be displayed on the display section 350.

When there is the display section identification information DID, the cloud print service branches the processing depending on the preview display setting of the management information IM1, that is, the display setting information IM12 associated with the user identification information UID (S404). When the preview display setting is the second setting of "not display", the cloud print service determines not to display the print preview screen D1 (S414), and ends the preview display determination processing.

When the preview display setting is the first setting of "display", the cloud print service branches the processing depending on whether or not there is the preview output destination of the management information IM1, that is, whether or not the display destination information IM11 is associated with the user identification information UID (S406). The cloud print service advances the processing to S412 when there is a preview output destination, and advances the processing to S408 when there is no preview output destination.

When there is no preview output destination, the cloud print service branches processing depending on whether or not the display section identification information DID is the same as the voice input/output apparatus identification information SID for the user identification information UID associated with the print instruction (S408). When the display section identification information DID is the same as the voice input/output apparatus identification information SID, the smart speaker 300 includes the display section 350, and thus, the cloud print service sets the preview output destination to the voice intermediary apparatus 400 (S410), and advances the processing to S412. When the display section identification information DID is different from the voice input/output apparatus identification information SID, the display section 350 that displays the print preview screen D1 is not specified, and thus, the cloud print service determines not to display the print preview screen D1 (S414), and ends the preview display determination processing. Therefore, when the identification information DID and SID are the same as each other for the user identification information UID associated with the print instruction, the preview processing section 123 determines that the voice intermediary apparatus 400 can display a screen on the display section 350.

In S412, the cloud print service determines to display the print preview screen D1, and ends the preview display determination processing.

After S214 of FIG. 10, the cloud print service advances the processing to S216 when it is determined that the print preview screen D1 is displayed, and skips the preview display processing of S216 to S230 when it is determined that the print preview screen D1 is not displayed, and advances the processing to S232.

When it is determined to display the print preview screen D1, the cloud print service performs preview display control processing for controlling the display of the print preview screen D1 (S216).

FIG. 13 schematically illustrates the preview display control processing performed in S216 of FIG. 10. When the preview display control processing starts, the cloud print service branches the processing depending on whether to newly generate the print preview screen D1 (S502). The determination processing of S502 is performed because there is a case where the cloud print service receives a change of the displayed print preview screen D1. The cloud print service advances the processing to S504 when newly generating the print preview screen D1, and advances the processing to S506 when receiving the change on the print preview screen D1. For example, when the print instruction by voice includes the display change keyword KE3, the processing of S506 is performed.

In S504, the cloud print service generates the print preview screen D1 according to the print setting PS1 determined in the print setting acquisition processing illustrated in FIG. 11. The determined print setting PS1 is the print setting instructed by the print setting keyword KE2 or the print setting stored in the print setting registration information IM2 illustrated in FIG. 4. For example, the cloud print service generates the print preview screen D1 in the portrait orientation when the portrait orientation is included in the print setting PS1, and generates the print preview screen D1 in the landscape orientation when the landscape orientation is included in the print setting PS1. Further, the cloud print service generates the print preview screen D1 in color when color is included in the print setting PS1, and generates the print preview screen D1 in monochrome when monochrome is included in the print setting PS1.

When the content CO1 based on the keyword KE0 includes the plurality of candidate contents CO2, the cloud print service generates the print preview screen D1 including at least two or more thumbnails among the plurality of thumbnails D2 corresponding to the plurality of candidate contents CO2 as described in FIG. 16.

In S506, the cloud print service performs processing of changing the displayed print preview screen D1. When the print instruction by voice includes the display change keyword KE3, the cloud print service performs the display change corresponding to the display change keyword KE3 on the print preview screen D1. For example, when enlargement is instructed, the cloud print service performs processing of enlarging the print preview screen D1. When the reduction is instructed, the cloud print service performs processing of reducing the print preview screen D1. When the page turning is instructed, the cloud print service performs processing of performing the page turning of the print preview screen D1.

After the processing of S504 or S506, the cloud print service acquires the preview output destination determined in the preview display determination processing illustrated in FIG. 12 (S508). When the processing of S410 of FIG. 12 is performed, the voice intermediary apparatus 400 is set as the preview output destination, and when the processing of S410 is not performed, the display destination information IM11 associated with the user identification information UID from the management information IM1 illustrated in FIG. 3 is set as the preview output destination.

After this, the cloud print service branches the processing depending on whether or not the preview output destination is the voice intermediary apparatus 400 (S510). When the preview output destination is the voice intermediary apparatus 400, the cloud print service performs a control of outputting the display request RE2 for displaying the print preview screen D1 on the display section 350 corresponding to the display section identification information DID associated with the user identification information UID in the management information IM1, to the voice intermediary apparatus 400 (S512). When the preview output destination is not the voice intermediary apparatus 400, the cloud print service performs a control of outputting the display signal directly to the display section 350 corresponding to the display section identification information DID associated with the user identification information UID in the management information IM1 (S514). The display section 350 in this case is, for example, the display panel 525 of the terminal 500 or the display panel 225 of the printer 200.

After the processing of S512 or S514, the cloud print service ends the preview display control processing.

In the processing of S216 of FIG. 10, when the processing of S512 of FIG. 13 is performed, the cloud print service issues the display request of the print preview screen D1 to the voice UI. The voice UI that received the display request issues the display request RE2 of the print preview screen D1 to the voice intermediary apparatus 400 (S218). The voice intermediary apparatus 400 that received the display request RE2 generates the display signal SG2 corresponding to the display request RE2 and transmits the display signal SG2 to the smart speaker 300 (S220). The smart speaker 300 that received the display signal SG2 displays the print preview screen D1 on the display section 350 based on the display signal SG2 (S222).

In the processing of S216 of FIG. 10, when the processing of S514 of FIG. 13 is performed, the cloud print service transmits the display signal SG2 of the print preview screen D1 to the display section 350, for example, the terminal 500 including the display panel 525 or the printer 200 including the display panel 225. The display section 350 that received the display signal SG2 displays the print preview screen D1 based on the display signal SG2 (S222).

As described above, the user US0 can see the print preview screen D1 corresponding to the content CO1 to be printed and can confirm the content CO1 to be printed. The user US0 can also confirm a part of the print setting PS1 by looking at the print preview screen D1. The user US0 looking at the print preview screen D1 can continue the processing by uttering the keyword KE0 such as print start, print setting, display change, and the like.

The smart speaker 300, which received the voice of the keyword KE0 from the user US0, converts the voice into the digital voice signal SG1 and transmits the voice signal SG1 to the voice intermediary apparatus 400 via the network NE1 (S224). The voice intermediary apparatus 400 that received the voice signal SG1 delivers the user identification information UID and the keyword KE0 to the voice UI, and requests processing to the voice UI (S226). Here, the voice intermediary apparatus 400 acquires the user identification information UID corresponding to the user US0, analyzes the voice based on the voice signal SG1, and extracts the keyword KE0 other than the request keyword from the voice analysis result. The voice UI acquires the keyword KE0 included in the user identification information UID and the print instruction by voice from a voice intermediary apparatus 400 (S228). After this, the voice UI performs the following processing in S230.

When the print start keyword KE1 illustrated in FIG. 5 is included in the print instruction, the voice UI issues a print start request for the content CO1 to the cloud print service. The cloud print service that received the print start request performs the processing of S232.

When the print setting keyword KE2 illustrated in FIG. 5 is included in the print instruction, the voice UI issues a change request for the print setting PS1 to the cloud print service. The cloud print service that received the change request performs the processing of S212.

When the display change keyword KE3 illustrated in FIG. 5 is included in the print instruction, the voice UI issues a display change request for the print preview screen D1 to the cloud print service. The cloud print service that received the display change request performs the processing of S216.

When the selection keyword KE4 illustrated in FIG. 5 is included in the print instruction, the voice UI issues a selection request for the thumbnail D2 to the cloud print service. The cloud print service that received the selection request performs the processing of S216 or S232.

When the thumbnail display keyword KE5 illustrated in FIG. 5 is included in the print instruction, the voice UI issues a thumbnail display request to the cloud print service. The cloud print service that received the thumbnail display request performs the processing of S216.

When the print cancellation keyword KE6 illustrated in FIG. 5 is included in the print instruction, the voice UI issues a print cancellation request to the cloud print service. The cloud print service that received the print cancellation request cancels printing without performing the processing after S232.

Hereinafter, the processing after S230 will be described with reference to the specific examples of FIGS. 14 to 17.

FIG. 14 schematically illustrates a specific example of the print preview screen D1 and printing. At the upper part of FIG. 14, the print preview screen D1 of the content CO1 specified from the keyword KE0 of "recommended photo" is illustrated. The print preview screen D1 is generated with the print setting PS1 of "standard image quality. When the print setting keyword KE2 of "high image quality" is included in the print instruction, the voice UI issues a print setting request for "high image quality" to the cloud print service. The cloud print service applies "high image quality" to the image quality of the print setting PS1 in S212, newly generates the print preview screen D1 according to the print setting PS1 of "high image quality" in S214 to S216, and displays the print preview screen D1 with "high image quality" on the display section 350 as illustrated in FIG. 14.

After this, when the print start keyword KE1 is included in the print instruction, the voice UI issues a print start request for the content CO1 to the cloud print service. In S232, the cloud print service acquires the content CO1 specified in S210 and generates the print data DA1 using the content CO1 according to the print setting PS1 determined in S212. When the server computer coupled to the network NE1 has the corresponding content CO1, the acquisition processing of the content CO1 can be, for example, processing in which the cloud print service receives the content CO1 from the above-described server computer via the network NE1. When the information processing apparatus 100 has the corresponding content CO1 at a part other than the cloud print service, the acquisition processing of the content CO1 can be, for example, processing in which the cloud print service reads the corresponding content CO1 from the outside of the cloud print service. When the storage section 121 in the cloud print service has the corresponding content CO1, the acquisition processing of the content CO1 can be, for example, processing in which the cloud print service reads the corresponding content CO1 to the RAM 103.

After generating the print data DA1, the cloud print service transmits the print data DA1 and the print setting PS1 via the network NE1 to the printer 200 corresponding to the printing apparatus identification information PID associated with the user identification information UID (S234). The printer 200 receives the print data DA1 and the print setting PS1 via the network NE1 (S236). After this, the printer 200 executes printing according to the print data DA1 and the print setting PS1 (S238). Accordingly, the content CO1 corresponding to the print preview screen D1 is printed according to the print setting PS1. At the lower part of FIG. 14, it is illustrated that the content CO1 corresponding to the "recommended photo" is printed according to the print setting PS1 of "high image quality".

Further, the cloud print service that transmitted the print data DA1 issues a notification that the printing of the corresponding content CO1 is completed to the voice UI (S240). This notification can be, for example, a notification that causes the smart speaker 300 to output voice such as "printed" together with the name of the corresponding content CO1. The voice UI that received the notification of print completion issues the notification of print completion to the voice intermediary apparatus 400. The voice intermediary apparatus 400 that received the notification of print completion generates the voice signal SG1 corresponding to the notification and transmits this voice signal SG1 to the smart speaker 300 (S242). The smart speaker 300 that received the voice signal SG1 converts the voice signal SG1 into voice and outputs this voice (S244). Accordingly, the user US0 can hear the voice that the content CO1 is printed.

When the print cancellation keyword KE6 is included in the print instruction instead of the print start keyword KE1, the voice UI issues a print cancellation request to the cloud print service. In this case, the cloud print service cancels printing without performing the processing after S232.

Figure 15:
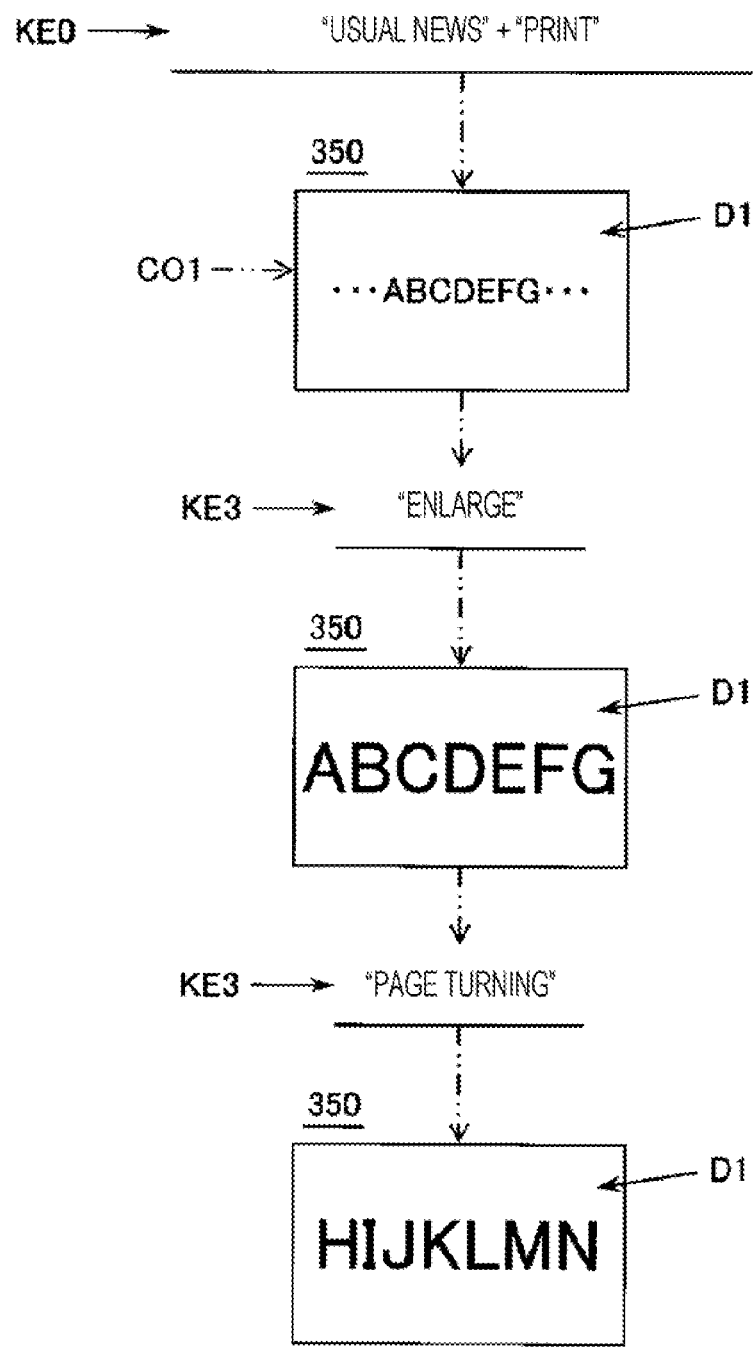
FIG. 15 is a diagram schematically illustrating an example of the print preview screen.

FIG. 15 schematically illustrates another specific example of the print preview screen D1. At the upper part of FIG. 15, the print preview screen D1 of the content CO1 specified from the keyword KE0 of "usual news" is illustrated. When the display change keyword KE3 of "enlarge" is included in the print instruction, the voice UI issues the display change request for "enlarge" to the cloud print service. In S216, the cloud print service performs processing of enlarging the displayed print preview screen D1 and displays the enlarged print preview screen D1 on the display section 350 as illustrated at the middle part of FIG. 15. After this, when the display change keyword KE3 of "page turning" is included in the print instruction, the voice UI issues the display change request for "page turning" to the cloud print service. In S216, the cloud print service performs processing of performing the page turning of the displayed print preview screen D1 and displays the print preview screen D1 to which the page turning was performed on the display section 350 as illustrated at the lower part of FIG. 15.

Furthermore, the display section 350 may itself receive an operation of display change such as enlargement, reduction, and page turning on the print preview screen D1. In this case, when the display section 350 issues an instruction for display change to the cloud print service, the cloud print service that received the instruction can perform the same processing as the voice instruction of the display change keyword KE3.

FIG. 16 schematically illustrates another specific example of the print preview screen D1 and printing. At the upper part of FIG. 16, the print preview screen D1 when the content CO1 specified from the keyword KE0 of "recommended photo" includes the plurality of candidate contents CO2 is illustrated. The preview processing section 123 displays the print preview screen D1 including at least two or more thumbnails among the plurality of thumbnails D2 corresponding to the plurality of candidate contents CO2, on the display section 350. On the print preview screen D1 illustrated at the upper part of FIG. 16, two or more thumbnails D2 displayed on the display section 350 are changed by performing a scroll operation or a voice instruction on the display section 350. A number for identification is attached to each thumbnail D2.

After this, when the selection keyword KE4 of "second" is included in the print instruction, the voice UI issues the selection request for the thumbnail D2 of "second" to the cloud print service. In S216, the cloud print service generates the print preview screen D1 corresponding to the candidate content CO2 of "second" corresponding to the thumbnail D2 selected by the selection keyword KE4, and displays the print preview screen D1 illustrated at the middle part of FIG. 16 on the display section 350. After this, when the print start keyword KE1 is included in the print instruction, the voice UI issues the print start request for the candidate content CO2 of "second" to the cloud print service. The cloud print service acquires the candidate content CO2 of "second" and generates the print data DA1 using the candidate content CO2 according to the print setting PS1 determined in S212. By performing the processing of S234 to S238, the candidate contents CO2 of "second" is printed according to the print setting PS1.

When the thumbnail display keyword KE5 is included in the print instruction instead of the print start keyword KE1, the voice UI issues a thumbnail display request to the cloud print service. In this case, in S216, the cloud print service displays the print preview screen D1 including at least two or more thumbnails among the plurality of thumbnails D2 corresponding to the plurality of candidate contents CO2, on the display section 350 again.

Furthermore, when the voice instruction of the selection keyword KE4 is issued in a state where two or more thumbnails D2 are displayed, the printing of the candidate content CO2 corresponding to the thumbnail D2 selected by the selection keyword KE4 may be started. In this case, when the selection keyword KE4 of "second" is included in the print instruction, the voice UI issues the selection request for the thumbnail D2 of "second" to the cloud print service. The cloud print service acquires the candidate content CO2 of "second" corresponding to the thumbnail D2 selected by the selection keyword KE4 in S232, and generates the print data DA1 using the candidate content CO2 according to the print setting PS1 determined in S212. By performing the processing of S234 to S238, the candidate contents CO2 of "second" is printed according to the print setting PS1.

It is needless to say that the display section 350 may itself receive an operation of selecting any one of the two or more thumbnails D2. In this case, when the display section 350 issues a selection instruction for indicating a thumbnail selected by the cloud print service, the cloud print service that received the selection instruction can perform the same processing as the voice instruction of the selection keyword KE4.

Figure 17:
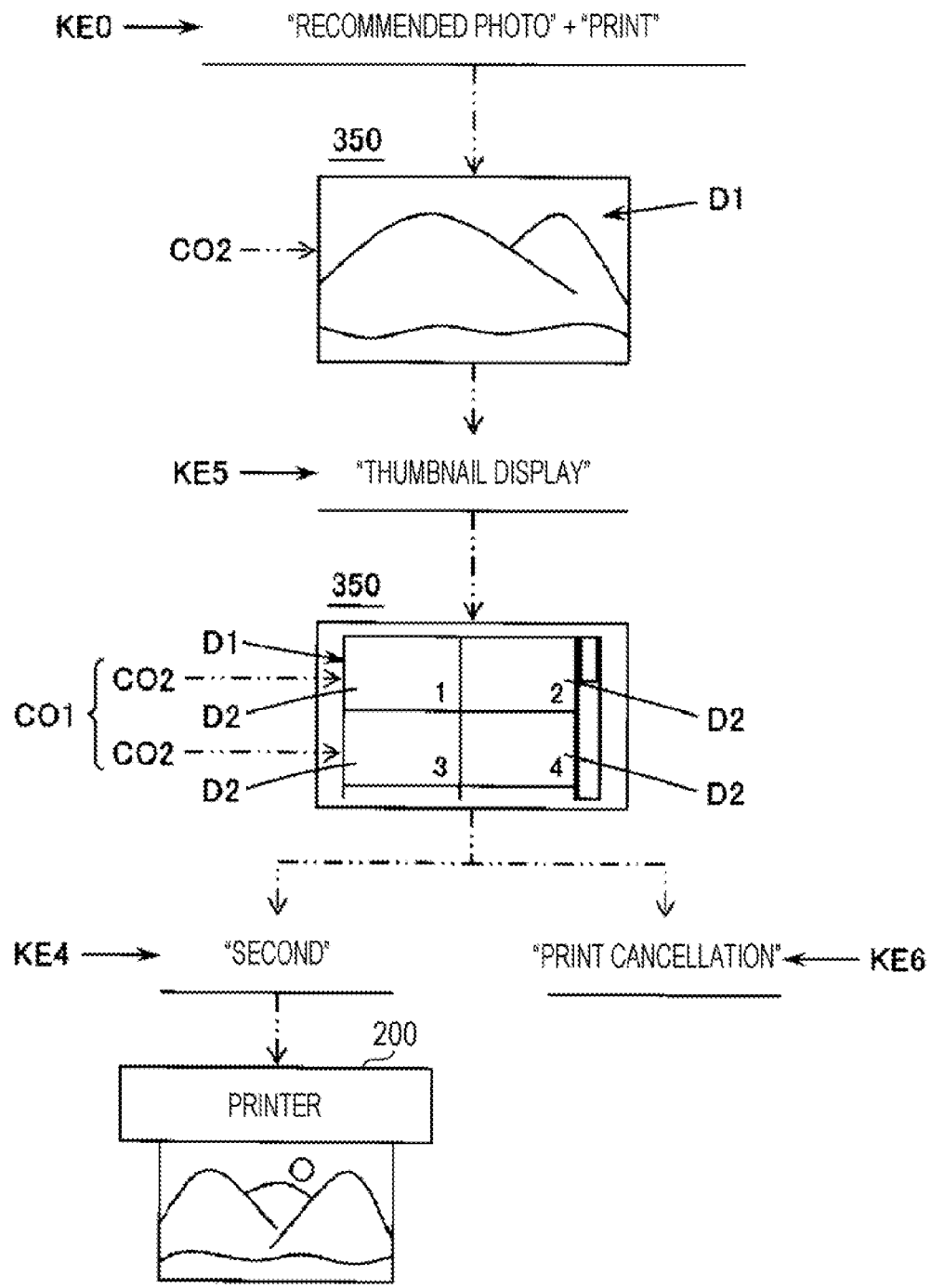
FIG. 17 is a diagram schematically illustrating an example of the print preview screen and printing.

Further, as illustrated in FIG. 17, on the assumption that the print preview screen D1 corresponding to one candidate content CO2 selected from the plurality of candidate contents CO2 is displayed, two or more thumbnails D2 are displayed corresponding to the voice instruction of the thumbnail display keyword KE5. As illustrated at the upper part of FIG. 17, the preview processing section 123 displays the print preview screen D1 corresponding to one candidate content CO2 randomly selected from the plurality of candidate contents CO2 included in the content CO1 specified by the keyword KE0 of "recommended photo", for example, on the display section 350. The candidate content CO2 to be displayed may be selected from the plurality of candidate contents CO2 in a predetermined order rather than randomly.

After this, when the thumbnail display keyword KE5 is included in the print instruction, the voice UI issues a thumbnail display request to the cloud print service. In this case, in S216, the cloud print service displays the print preview screen D1 including at least two or more thumbnails among the plurality of thumbnails D2 corresponding to the plurality of candidate contents CO2, on the display section 350. On the print preview screen D1 illustrated at the middle part of FIG. 17, two or more thumbnails D2 displayed on the display section 350 are changed by performing a scroll operation or a voice instruction on the display section 350. A number for identification is attached to each thumbnail D2.

After this, when the selection keyword KE4 of "second" is included in the print instruction, the voice UI issues the selection request for the thumbnail D2 of "second" to the cloud print service. The cloud print service acquires the candidate content CO2 of "second" corresponding to the thumbnail D2 selected by the selection keyword KE4 in S232, and generates the print data DA1 using the candidate content CO2 according to the print setting PS1 determined in S212. By performing the processing of S234 to S238, the candidate contents CO2 of "second" is printed according to the print setting PS1. It is needless to say that, as illustrated in FIG. 16, the cloud print service may display the print preview screen D1 corresponding to the selected candidate content CO2 on the display section 350 in response to the voice instruction of the selection keyword KE4.

When the print cancellation keyword KE6 is included in the print instruction instead of the print start keyword KE1, the voice UI issues a print cancellation request to the cloud print service. In this case, the cloud print service cancels printing without performing the processing after S232.

As described above, since the print preview screen D1 corresponding to the content CO1 based on the keyword KE0 included in the print instruction by voice is displayed, the user US0 can visually confirm the content CO1 to be printed by looking at the print preview screen D1. In addition, the user US0 can also confirm a part of the print setting PS1 by looking at the print preview screen D1, and can change the print setting PS1. Furthermore, since the user US0 can visually confirm the plurality of thumbnails D2 corresponding to the plurality of candidate contents CO2, by selecting the print target from the plurality of thumbnails D2, the candidate contents CO2 to be printed can be easily selected.

As described above, the user US0 easily gets to know whether or not the intended content CO1 is printed. Therefore, according to this specific example, it becomes possible to suppress the unintended printing when the user instructs the printing by voice.

(5) Modification Example

Various modification examples of the present disclosure can be considered.

The voice input/output apparatus to which the present technology is applicable is not limited to the smart speaker, and may be a terminal such as a smartphone or a tablet, a personal computer, or the like.

The above-described processing can be appropriately changed by exchanging the order. For example, in the management information registration processing of FIG. 8, the order of each processing of S104 to S114 can be exchanged in any manner, and in the print setting registration processing of FIG. 9, the processing of S134 and the processing of S136 can be exchanged.

The various display settings described above may be switched by the voice instruction or operation of the user. For example, it is assumed that the content CO1 includes the plurality of candidate contents CO2. In this case, a thumbnail display setting for initially displaying two or more thumbnails D2 as illustrated in FIG. 16, and an exemplary display setting for initially displaying the print preview screen D1 corresponding to one candidate content CO2 as illustrated in FIG. 17, may be switched by the voice instruction or the operation of the user US0.

In the example illustrated in FIG. 12, when the display section identification information DID is not associated with the user identification information UID in the management information IM1, the display section identification information DID associated with the user identification information UID may be received.

FIG. 18 schematically illustrates another example of the preview display determination processing performed in S214 of FIG. 10. In the preview display determination processing illustrated in FIG. 18, the processing of S422 to S428 is added to the preview display determination processing illustrated in FIG. 12. Here, S422 to S426 correspond to the management information updating step ST2, the management information update section 122, and the management information update function FU2.

When the cloud print service determines that the display section identification information DID is not associated with the user identification information UID in the management information IM1 illustrated in FIG. 3 (S402), the input of the display ID is received from the external apparatuses 400 and 500 (S422). When the cloud print service can output the management information registration screen to the external apparatuses 400 and 500, the processing of S422 may be the same processing as S108 of FIG. 8. In addition, the cloud print service acquires the display destination information IM11 indicating the preview output destination illustrated in FIG. 3 (S424). The processing of S424 may be the same processing as S110 of FIG. 8. After this, the cloud print service updates the management information IM1 by storing the information acquired in the processing of S422 to S424 in the management information IM1 (S426). The information which is not acquired in the processing of S422 to S424 is not stored in the management information IM1. Therefore, the cloud print service branches the processing depending on whether or not the display ID is input in S422 (S428). When the display ID is input, the display section 350 that displays the print preview screen D1 is specified, and thus, the cloud print service advances the processing to S404. When the preview display setting is the first setting of "display" and the preview output destination is the identification information DID and SID, the print preview screen D1 is displayed on the display section 350 corresponding to the display section identification information DID input in S422. When the display ID is not input, the display section 350 that displays the print preview screen D1 is not specified, and thus, the cloud print service determines not to display the print preview screen D1 (S414), and ends the preview display determination processing.

In the example illustrated in FIG. 18, even when the display section identification information DID is not associated with the user identification information UID in the management information IM1, the display of the print preview screen D1 becomes possible, and thus, the convenience of the user can be improved.

Further, in the above-described example, the information processing apparatus 100 stores the user ID as the user identification information UID for identifying the user US0 in the storage section 121, and the cloud print service manages the user identification information UID different for each user while cooperating with the voice intermediary apparatus 400, but a character string for identifying a user, such as an access token, may be sent using a mechanism such as OAuth2 instead of the user ID between the information processing apparatus 100 and the voice intermediary apparatus 400.

(6) Conclusion

As described above, according to the present disclosure, it is possible to provide a technology or the like for suppressing unintended printing when a user instructs printing by voice in various aspects. It is needless to say that the basic operation and effect described above can be obtained even by the technology configured only of the constituent elements according to the independent claims.

Further, a configuration obtained by replacing or combining each configuration disclosed in the above-described examples, a configuration obtained by replacing each configuration with each other or combining the configurations disclosed in the known technology and the above-described example. The present disclosure also includes these configurations and the like.

What is claimed is:

1. A printing system comprising a printing apparatus and an information processing apparatus coupled to the printing apparatus via a network, the information processing apparatus configured to cause a screen to be displayed on a display section of a smart speaker, wherein
the information processing apparatus includes
an information acquisition section configured to acquire information from a voice intermediary apparatus that received a print instruction from the smart speaker configured to receive a user's voice indicating the print instruction, the information acquired including a keyword that was included in the print instruction and a user identifier,
a preview processing section that is configured to cause a print preview screen to be displayed on the display section of the smart speaker, the print preview screen displaying a preview of content that is determined by the acquired keyword, the preview processing section further configured to output a display request for displaying the print preview screen on the display section to the voice intermediary apparatus when the voice intermediary apparatus is able to display the screen on the display section, and
a print data transmission section configured to receive the content and the user identifier from the information acquisition section, acquire a print setting corresponding to the user identifier, and generate print data using the content based on the acquired print setting, and configured to transmit the print data to the printing apparatus, and
the printing apparatus configured to receive the print data and executes printing according to the print data.

2. The printing system according to claim 1, wherein
the keyword includes a print start keyword for starting printing of the content corresponding to the print preview screen, and
the print data transmission section is configured to transmit the print data to the printing apparatus when the print start keyword is acquired by the information acquisition section.

3. The printing system according to claim 1, wherein
the preview processing section is configured to determine that the voice intermediary apparatus is able to display the screen on the display section when the information from the voice intermediary apparatus includes display section identification information for identifying the display section, and outputs the display request to the voice intermediary apparatus.

4. The printing system according to claim 3, wherein
the information processing apparatus further includes a storage section that is configured to store management information in which voice input/output apparatus identification information for identifying a voice input/output apparatus managed by the voice intermediary apparatus and the display section identification information for identifying the display section are associated with user identification information for identifying a user, and
the preview processing section configured to display the print preview screen on the display section corresponding to the display section identification information.

5. The printing system according to claim 4, wherein
the information processing apparatus further includes a management information update section that is configured to update the management information based on the information from the voice intermediary apparatus.

6. The printing system according to claim 5, wherein
the management information update section is configured to perform processing of receiving an input of the display section identification information when the display section identification information is not associated with the user identification information associated with the print instruction, and is configured to update the management information to a state where the display section identification information is associated with the user identification information when the display section identification information is input.

7. The printing system according to claim 4, wherein
the preview processing section is configured to output a display request for displaying the print preview screen on the display section to the voice intermediary apparatus when the display section identification information is the same as the voice input/output apparatus identification information for the user identification information associated with the print instruction.

8. The printing system according to claim 4, wherein
the storage section is configured to store the management information in which display destination information indicating whether to output a display request for displaying the print preview screen on the display section to the voice intermediary apparatus is associated with the user identification information, and
the preview processing section is configured to output the display request to the voice intermediary apparatus when the display destination information indicates that the display request is output to the voice intermediary apparatus.

9. The printing system according to claim 1, wherein
the information processing apparatus further includes a setting reception section configured to receive any one of a first setting for displaying the print preview screen and a second setting for not displaying the print preview screen, and
the preview processing section is configured to display the print preview screen on the display section when the first setting is received, and is configured to not display the print preview screen on the display section when the second setting is received.

10. A printing method using a printing apparatus, an information processing apparatus coupled to the printing apparatus via a network, the information processing apparatus causing a screen to be displayed on a display section of a smart speaker, the method comprising:

an information acquiring step in the information processing apparatus, of acquiring information from a voice intermediary apparatus that received a print instruction from the smart speaker configured to receive a user's voice indicating the print instruction, the information acquired including a keyword that was included in the print instruction and a user identifier;

a preview processing step of causing a print preview screen to be displayed on the display section of the smart speaker, the print preview screen displaying a preview of content that is determined by the acquired keyword, the preview processing step further including outputting, by the information processing apparatus, a display request for displaying a print review screen on the display section to the voice intermediary apparatus when the voice intermediary apparatus is able to display the screen on the display section;

a print data generating step of receiving the content and the user identifier from an information acquisition section, acquiring a print setting corresponding to the user identifier, and generating print data using the content based the acquired print setting;

a print data transmitting step of transmitting the generated print data to the printing apparatus from the information processing apparatus; and a printing step of executing printing in the printing apparatus according to the transmitted print data.

11. An information processing apparatus that is coupled to a printing apparatus via a network, the printing apparatus configured to execute printing according to print data, the information processing apparatus configured to display a screen on a display section of a smart speaker, the apparatus comprising:

an information acquisition section configured to acquire information from a voice intermediary apparatus that received a print instruction from the smart speaker configured to receive a user's voice indicating the print instruction, the information acquired including a keyword that was included in the print instruction and a user identifier;

a preview processing section that is configured to cause a print preview screen to be displayed on the display section of the smart speaker, the print preview screen displaying a preview of content that is determined by the acquired keyword, the preview processing section further configured to output a display request for displaying the print preview screen on the display section to the voice intermediary apparatus when the voice intermediary apparatus is able to display the screen on the display section; and a print data transmission section configured to receive the content and the user identifier from the information acquisition section, acquire a print setting corresponding to the user identifier, and generate print data using the content based on the acquired print setting and configured to transmit the print data to the printing apparatus.

* * * * *